(12) United States Patent
Ida et al.

(10) Patent No.: US 7,997,913 B2
(45) Date of Patent: Aug. 16, 2011

(54) CARD CONNECTOR WITH DOUBLE CAM

(75) Inventors: Ayako Ida, Yamato (JP); Hisato Takase, Yamato (JP); Junichi Miyazawa, Yamato (JP); Akihiro Tezuka, Yamato (JP); Hideo Nagasawa, Yamato (JP); Katsunori Kasahara, Yamato (JP)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 12/308,038

(22) PCT Filed: Jun. 5, 2007

(86) PCT No.: PCT/US2007/013250
§ 371 (c)(1),
(2), (4) Date: Sep. 3, 2009

(87) PCT Pub. No.: WO2007/145952
PCT Pub. Date: Dec. 21, 2007

(65) Prior Publication Data
US 2010/0159724 A1 Jun. 24, 2010

(30) Foreign Application Priority Data

Jun. 5, 2006 (JP) .................................. 2006-156381

(51) Int. Cl.
*H01R 13/62* (2006.01)
(52) U.S. Cl. ........................................ 439/159; 439/630
(58) Field of Classification Search .................. 439/157, 439/159, 629, 630
See application file for complete search history.

(56) References Cited

U.S. PATENT DOCUMENTS
6,089,891 A 7/2000 Nishioka

FOREIGN PATENT DOCUMENTS
| | | |
|---|---|---|
| EP | 1508873 A1 | 2/2005 |
| JP | 2004178955 A | 6/2004 |
| JP | 2005302423 A | 10/2005 |
| WO | 2004/032035 A1 | 4/2004 |
| WO | 2004/063972 A1 | 7/2007 |

OTHER PUBLICATIONS

International Preliminary Examination Report for PCT Patent Application No. PCT/US2007/013250, issued Dec. 10, 2008.

*Primary Examiner* — Khiem Nguyen
(74) *Attorney, Agent, or Firm* — Timothy M. Morella

(57) ABSTRACT

A card connector includes a housing having a receptacle to receive therein a card in an insertion direction and the card has a terminal member. A connection terminal is secured to the housing and is configured to contact the terminal member of the card. A card ejecting action detecting switch is configured to detect when the card is ejected from the housing. A card guide mechanism is provided with an urging member for urging the card in a direction opposite the insertion direction. The card guide mechanism is configured to hold the card at a locked position to ensure that the terminal member of the card is in contact with the connection terminal and to permit movement of the card in the opposite direction by a pushing force exerted on the card in the insertion direction. The card guide mechanism ejects the card after performing a pushing action on the card a plurality of times.

19 Claims, 16 Drawing Sheets

CARD CONNECTOR WITH DOUBLE CAM

BACKGROUND OF THE INVENTION

The present invention relates to a card connector. Conventionally, electronic devices such as personal computers, portable phones, PDAs (Personal Digital Assistants), digital cameras, video cameras, music players, game machines, and vehicular navigation systems are quipped with connectors for cards so that various memory cards such as SIM (Subscriber Identity Module) cards, MMC® (Multi Media Cards), SD® (Secure Digital) cards, mini SD® cards, Memory Stick®, and Smart Media® can be used.

In this case, it might be considered to use a delay switch for detecting an early stage of motion to withdraw a card mounted in the above-described electronic device from the device. For example, if a memory card is withdrawn from an electronic device while a computing means of the electronic device is accessing to the memory card to execute a process, a data bus which connects the computing means and the memory card is disconnected in the middle of the data transmission process. Therefore, the data might be damaged, or the computing means may stop operating and never recover. The above-mentioned delay switch detects the initial action of withdrawing the memory card, and this provides time to safely disconnect the computing means and the memory card before the terminals of the card connector and the contact pads of the memory card are disconnected from each other.

However, in some so-called "push-in/push-out" or "push-push" type of card connectors which are used with a relatively small card, the moving distance of a memory card is short because of the small size, and therefore it is difficult to secure a sufficient length of delay time that starts from a pushing action to eject a memory card and ends when the terminals of the card connector and the contact pads of the memory card are disconnected from each other.

A certain technology capable of prolonging a travel time of a memory card has already been proposed for a push-push type card connector. (For example, refer to Japanese Patent Application Laid-Open (Kokai) No. 2005-302423.)

FIG. 16 is a view showing a heart cam mechanism in a conventional card connector.

In this drawing, reference numeral 314 represents a heart shaped cam member, which is slidably attached to a housing of a card connector (not shown) while being urged in one direction by a coil spring 315. One end of a pin member 317 is pivotally connected to a supporting portion 304 of the housing, and the free end 305 of the pin member 317 is engaged in a cam groove 318 formed in the top surface of the heart cam member 314. In addition, the cam groove 318 includes a first guide portion 307 and a second guide portion 308, both being formed into a zigzag shape.

When a memory card is inserted into the housing, the heart cam member 314 is pushed toward the back of the housing by the memory card that is pushed by a finger of a user, and moves in the direction indicated by the arrow A. At this time, the free end 305 of the pin member 317 passes through the zigzag-shaped first guide portion 307. Therefore, even if the user remove his/her finger from the memory card by mistake, the first guide portion 307 puts a brake on the pin member 317 so that the heart cam member 314 does not move back rapidly.

Moreover, when the user pushes a memory card by his/her finger to remove the memory card from the housing, the free end 305 of the pin member 317 engaged and stopped in the cam groove 318 is unlocked. As a result, the heart cam member 314 is released, and moves with the memory card in the direction indicated by the arrow B. At this time, the free end 305 of the pin member 317 moves past the zigzag-shaped second guide portion 308. Therefore, braking is applied to the pin member 317, and the heart cam member 314 slows down. This prevents the memory card from popping out from the housing of the card connector.

Nevertheless, the conventional card connector failed to take into consideration the use of a delay switch and thus, could not secure a sufficient length of time for removing a memory card from the housing. In a heart cam mechanism as described above, the heart cam member 314 slows down by allowing the free end 305 of the pin member 317 to pass along the zigzag-shaped second guide portion 308. However, if the zigzag angles are too acute, the free end 305 is not permitted to pass through the second guide portion 308, and eventually stops moving. Hence, in practical use, the zigzag angles must be increased so that the free end 305 can move along the second guide portion 308 smoothly, thus decreasing the ability to significantly slow down the heart cam member 314 to secure a sufficient length of time for withdrawing a memory card from the housing.

SUMMARY OF THE INVENTION

The present invention has an object, by solving the above problem of the conventional card connector, to provide a card connector in which upon ejection of a card, the card is ejected after a plurality of pushing motions are applied, and a card ejecting action detecting switch is provided for detecting start of card ejection during a forward-moving stroke of the card by the first pushing motion, so that the connector can have a simplified structure while contributing to a cost reduction, can be small in its size, can secure a sufficiently long delay time, and can appropriately detect a card ejecting action.

Therefore, a card connector according to the present invention comprises a housing which accommodates therein a card provided with a terminal member, a connection terminal which is secured to the housing and comes into contact with the terminal member of the card, a card ejecting action detecting switch configured to detect that the card is ejected from the housing, and a card guide mechanism provided with an urging member for urging the card in a direction opposite to an insertion direction thereof, the card guide mechanism being configured to hold the card at a locking position to ensure that the terminal member of the card to be in contact with the connection terminal, and to allow the card to be moved in the opposite direction of the insertion direction from the end point by an urging force of the urging member to thereby eject the card, after the card held at the locking position is moved in the insertion direction by a pushing action for pushing the card in the inserting direction and reaches an end point, wherein the card guide mechanism ejects the card after performing of a plurality of times of pushing action, and the card ejecting action detecting switch detects a start of ejection of the card during a time period from commencing of a movement of the card in the insertion direction by a first time pushing action for pushing the card in the insertion direction, and ends at a time when the card reaches the end point.

In another card connector according to the present invention, the card guide mechanism further comprises a movable cam member formed with a cam groove in a surface thereof, and a fixed cam member having one end thereof engaged into the cam groove, and the cam groove has a shape where a region corresponding to the locking position and a region corresponding to the end point are arranged alternately.

In yet another card connector according to the present invention, the pushing actions performed occur twice, and the card guide mechanism holds the card at a first locking position to ensure that the terminal member of the card and the connection terminal are kept in contact with each other, and, after the card held at the first locking position is moved in the insertion direction by a pushing action for pushing the card in the insertion direction and reaches a first end point, the card guide mechanism allows the card to move in an opposite direction of the insertion direction from the first end point by urging force of the urging member, and further, after the card held at the second locking position is moved in the insertion direction by the pushing action for pushing the card in the insertion direction and reaches a second end point, the card guide mechanism allows the card to move in the opposite direction of the insertion direction from the second end point by urging force of the urging member to thereby eject the card.

Moreover, in yet another card connector according to the present invention, the second locking position is closer to a front side of the card connector relative to an ejection direction of the card than the first locking position.

Yet another card connector according to the present invention further comprises a card detection switch configured to detect that the terminal member of the card and the connection terminal are in contact with each other.

In accordance with the present invention, the card connector is configured in a manner such that a card is ejected after pushing actions are performed a plurality of times, and a card ejecting action detecting switch is provided for detecting start of card ejection during the forward stroke of the card by the pushing action of the first time. Therefore, the card connector can be of a simpler structure resulting in contribution to a reduction in the manufacturing cost, can bring about reduction in its size, and can provide a sufficiently long delay time to ensure appropriate detection of a card ejecting action.

BRIEF DESCRIPTION OF THE DRAWINGS

FIGS. 7A to 7G are diagrammatic views showing operations of a cam mechanism according to the embodiment of the present invention, in which FIG. 7A illustrates an initial state of card insertion, FIG. 7B illustrates a state where a free end of a pin member has reached a first end point, FIG. 7C illustrates a state where the free end of the pin member has reached a first locking position, FIG. 7D illustrates a state where the free end of the pin member has again reached the first end point, FIG. 7E illustrates a state where the free end of the pin member has reached a second locking position, FIG. 7F illustrates a state where the free end of the pin member has reached a second end point, and FIG. 7G illustrates a state where the free end of the pin member has returned to the initial state of card insertion.

DESCRIPTION OF THE PREFERRED EMBODIMENTS

Preferred embodiments of the present invention will be described below in detail with reference to the accompanying drawings.

Figure 1:
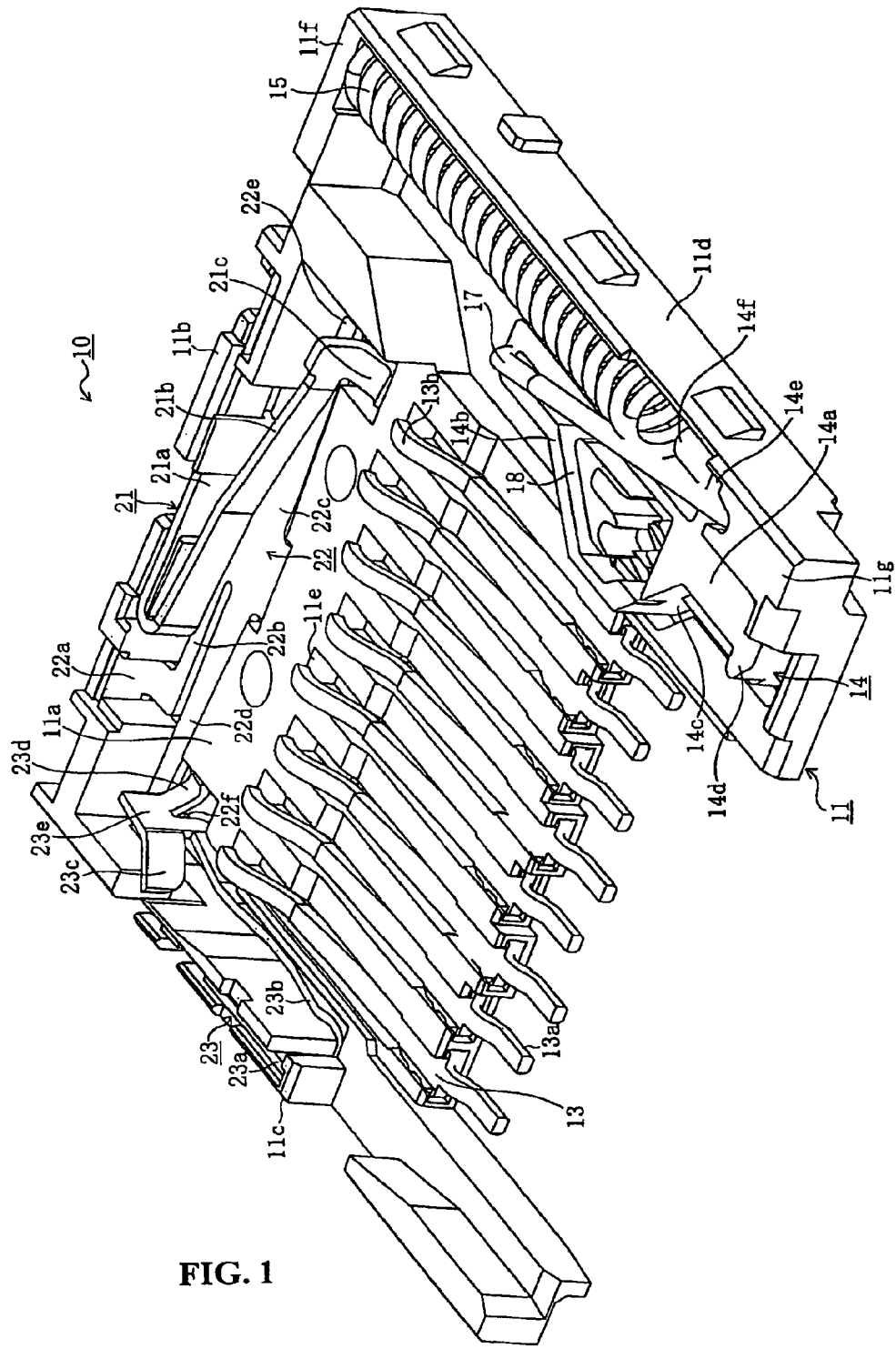
FIG. 1 is a perspective view showing a card connector without a shell according to an embodiment of the present invention.
Figure 2:
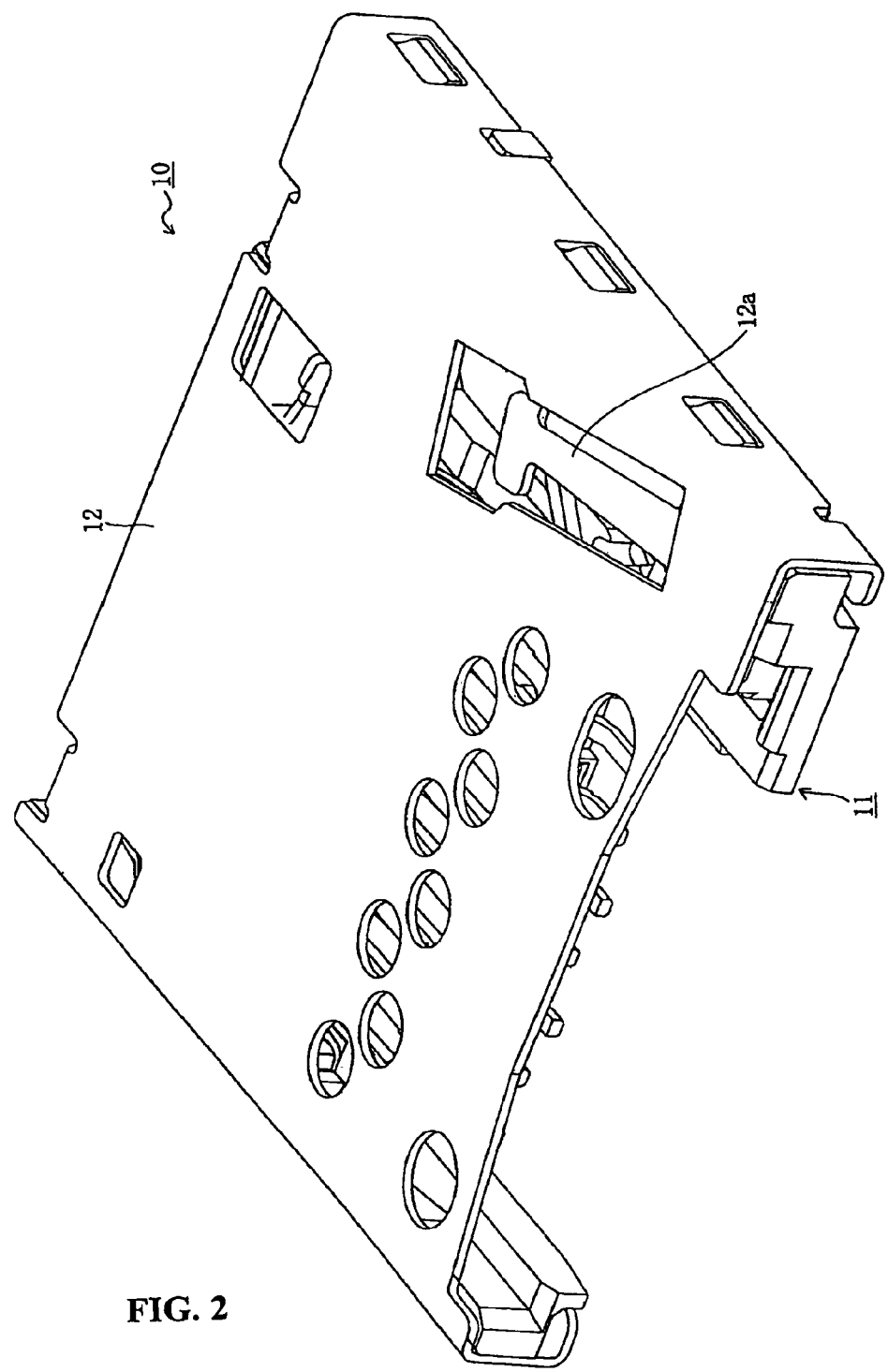
FIG. 2 is a perspective view showing the card connector according to the embodiment of the present invention.
Figure 3:
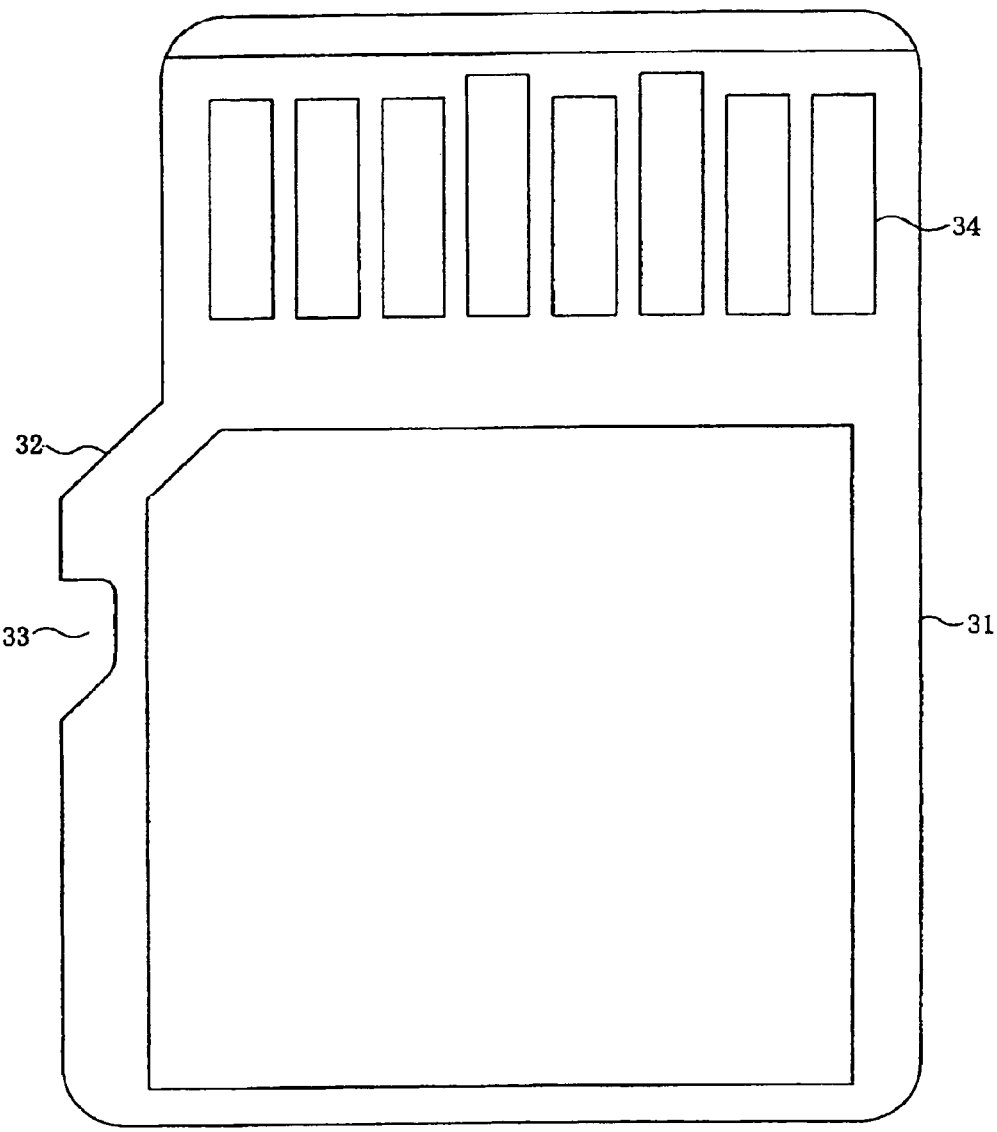
FIG. 3 is a plan view showing the bottom face of a card according to the embodiment of the present invention.
Figure 4:
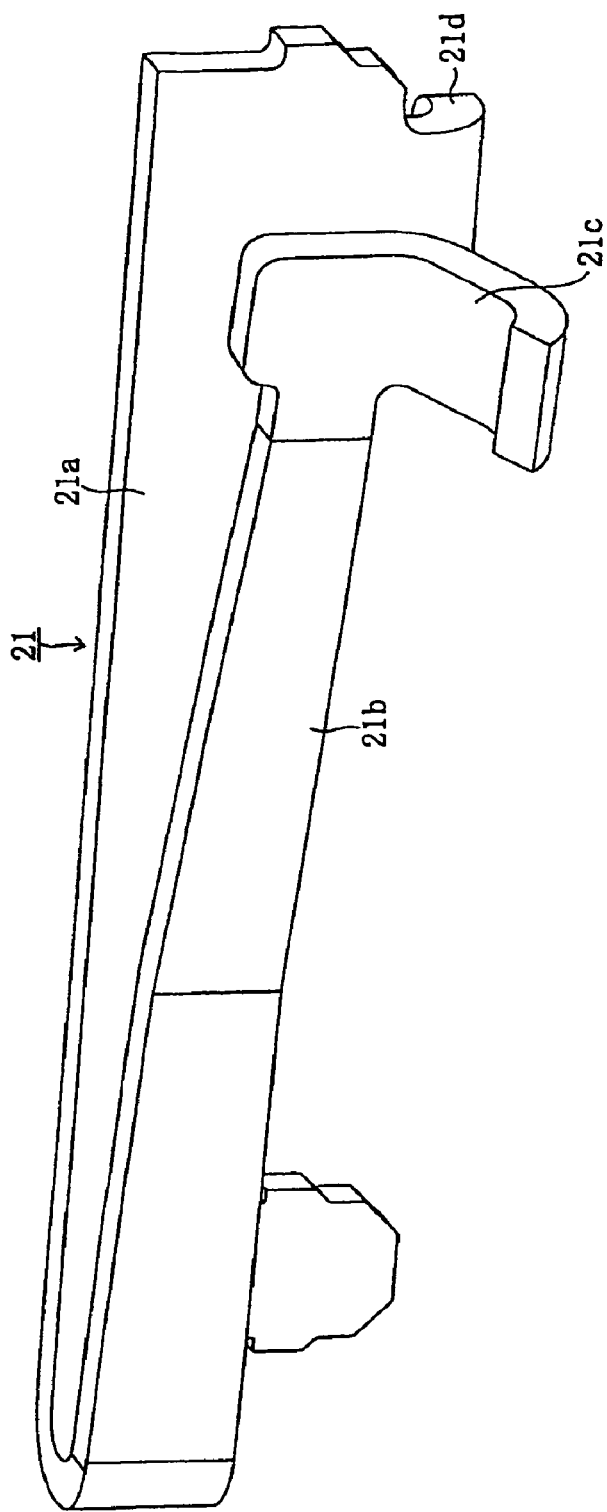
FIG. 4 is a perspective view showing the first contact member according to the embodiment of the present invention.
Figure 5:
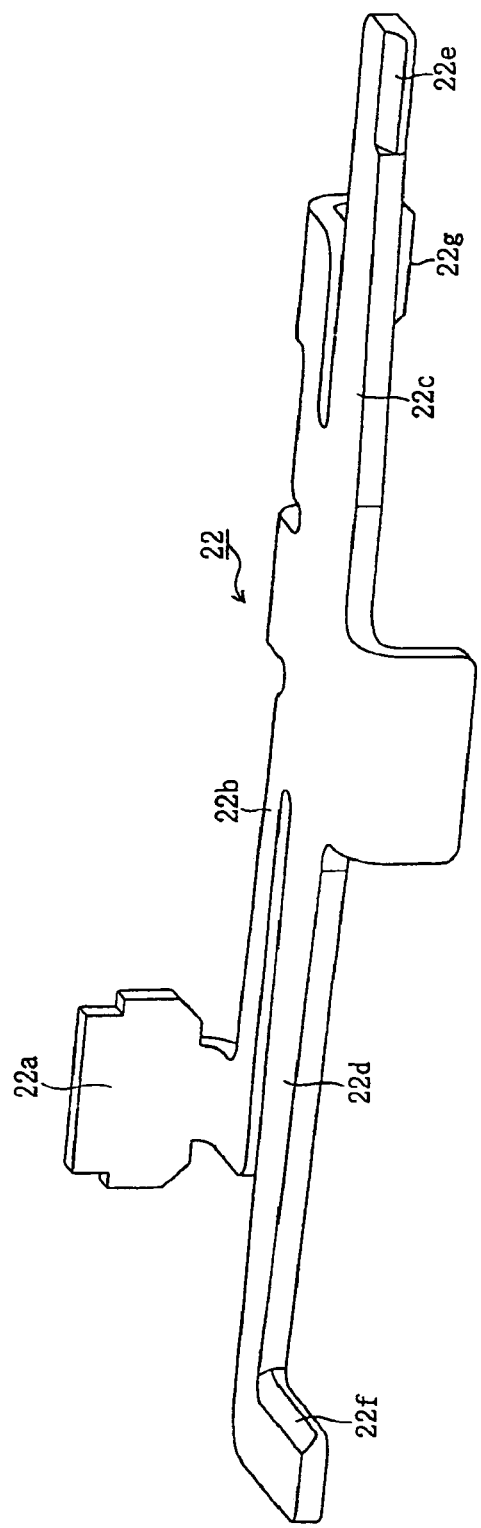
FIG. 5 is a perspective view showing a shared contact member according to the embodiment of the present invention.
Figure 6:
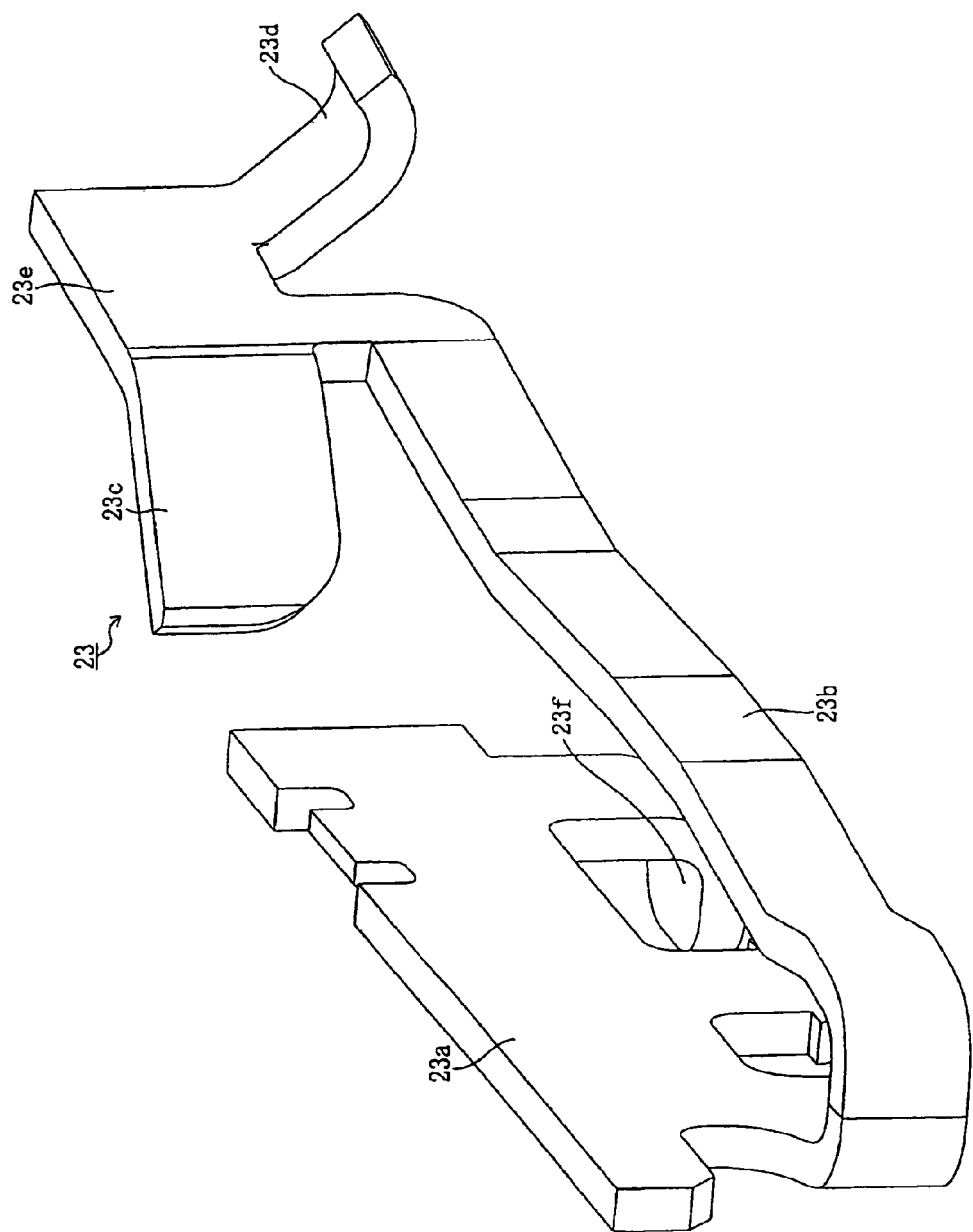
FIG. 6 is a perspective view showing a second contact member according to the embodiment of the present invention.

FIG. 1 is a perspective view showing a card connector without a shell according to an embodiment of the present invention, FIG. 2 is a perspective view showing the card connector according to the embodiment of the present invention, FIG. 3 is a plan view showing the bottom face of a card according to the embodiment of the present invention, FIG. 4 is a perspective view showing a first contact member according to the embodiment of the present invention, FIG. 5 is a perspective view of a shared contact member according to the embodiment of the present invention, and FIG. 6 is a perspective view showing a second contact member according to the embodiment of the present invention.

In these drawing figures, reference numeral 10 denotes a card connector according to the present embodiment, and is secured to an electronic device (not shown). A card 31 is inserted into the card connector 10, and the card 31 is loaded onto the electronic device via the card connector 10. It should be noted that the electronic device may be any type of device, such as a personal computer, a portable phone, a PDA, a digital camera, a video camera, a music player, a game console, a vehicular navigation system.

The card 31 may be any type of IC card such as a SIM card, a MMC®, a SD® card, a mini SD® card, a Memory Stick®, a Smart Media®, a T-Flash (Trans-Flash) memory card, a micro SD® card, but in this embodiment, for the simplicity sake, the card 31 is comprised of a micro SD® card having a shape like the one depicted in FIG. 3. Further, in this embodiment, representation of directions such as up, down, left, right, front, rear, and the like, used for explaining the structure and movement of each part of the card connector 10, are not absolute, but relative. These representations are appropriate when the card connector 10 or each constituent thereof is in the position shown in the drawing figure. If the position of the card connector 10 or its constituent changes, however, it is assumed that these representations are to be changed according to the change in the position of the card connector, its each constituent and the like.

At this stage, as shown in FIG. 2, the card connector 10 includes a housing 11 integrally formed of an insulating material such as a synthetic resin and accommodating the card 31, and a shell 12 formed by, for example, applying processing such as punching or bending to a plate-like material that is made of an electrically conductive material such as metal. Also, the shell 12 is secured to the top side of the housing 11. The card connector 10 has a flat rectangular parallelepiped shape, and is attached to the electronic device. The card 31 is inserted into the card connector 10 from the front side (left bottom side in FIG. 2) thereof.

Further, FIG. 1 is a perspective view showing the card connector 10 in a state where the shell 12 is removed for the sake of explanation. As shown in FIG. 1, the housing 11 includes a bottom wall portion 11a and an innermost wall portion 11b. The bottom wall portion 11a has a shape where its front edge side (left bottom side in FIG. 1), that is the front side thereof relative to the insertion direction of the card 31, was cut away in an approximate U-shape. The innermost wall portion 11b extends along an innermost edge provided in the innermost portion of the bottom wall portion 11a and standing upright from the bottom wall portion 11a. Here, in the top surface of the bottom wall portion 11a, a plurality of terminal fitting slots 11e are formed along the front-back direction, and terminals 13 serving as connection terminals are inserted and attached to these terminal fitting slots 11e, respectively. In each of the terminals 13, the root portion thereof is fitted into a part of the terminal fitting slot 11e on the side close to the front edge of the bottom wall portion 11a, and the tip portion of the terminal 13 extends obliquely upward while directing toward the innermost wall portion 11b, and is projected above the top surface of the bottom wall portion 11a. The tip portions 13b of the terminals 13 work as contacting portions which come into contact with and are electrically connected to contact pads 34 which are provided on the bottom surface of the card 31 to function as terminal members. Solder tail portions 13a extending from the root portions of the terminals 13 are disposed so as to project frontward from the front edge of the bottom wall portion 11a. In addition, the solder tail portions 13a are electrically connected to signal lines, contact pads, terminals and the like, in other words, terminal member on the target or objective side, by soldering.

The housing 11 also includes a first side wall portion 11c and a second side wall portion 11d. The first side wall portion 11c works as a side wall portion which extends in a direction from the front to the rear along one side edge of the bottom wall portion 11a, and has an L-shape in cross section. The second side wall portion 11d works as another side wall portion which also extends in a direction from the front to the rear along the other side edge of the bottom wall portion 11a. A slide member 14, which is a card guide mechanism for guiding the card 31 inserted into the card connector 10, is attached to the second side wall portion 11d so as to be slidable in the back and forth direction.

Here, the slide member 14 includes a card holding portion 14a for holding the card 31, and a slide cam portion 14b as a movable cam member. Note that the card holding portion 14a and the slide cam portion 14b are formed integrally. The card holding portion 14a includes a first engaging portion 14c and a second engaging portion 14d, formed to protrude from the inner side surface of the card holding portion 14a. The first engaging portion 14c and the second engaging portion 14d are engaged with an engaging convex portion 32 and an engaging concave portion 33 formed on a side surface of the card 31 as engaging portions, respectively. Then, the slide member 14 holds the card 31 by means of the first engaging portion 14c and the second engaging portion 14d of the card holding portion 14a, and moves together with the card 31 in the back and forth direction.

Moreover, an urging force receiving portion 14e which receives urging force from a urging member 15 made of a coil spring is protruded from the outer side surface of the card holding portion 14a. In the urging force receiving portion 14e, a latching projection 14f for latching the urging member 15 is formed, and one end of the urging member 15 is attached to the latching projection 14f. The other end of the urging member 15 is attached to a latching portion 11f of the innermost wall portion 11b. It should be noted that the latching portion 11f is also provided with a latching projection for latching the urging member 15. Accordingly, the slide member 14 is constantly urged by the urging member 15 in the opposite direction of the insertion direction of the card 31, in other words, in the ejection direction of the card 31. Note that, in FIG. 1, depiction of the urging member 15 is partially omitted.

The card connector 10 is so called a "push-in/push-out" or "push-push" type which requires a pushing action of the card 31 both to insert the card 31 into the card connector 10 and to eject the card 31 from the card connector 10. This type of action is similar to an alternate action (lock type, push-on/push-off type) in the field of pushing buttons. The slide cam portion 14b functions as a slide cam in a cam mechanism for performing the push-push type action. It should be noted that the cam mechanism in this embodiment is different from the heart-shaped cam mechanism used as an operation mechanism for the alternate action in the conventional card connector, in that pushing actions of this embodiment are performed in a plurality of times as pushing actions for pushing out and ejecting the card 31.

Therefore, a cam groove 18 is formed in the top surface of the slide cam portion 14b, and a free end of the long and thin pin member 17 which functions as a fixed cam member is engaged with the cam groove 18. Further, the other end of the pin member 17 is engaged in and connected, by a pivotal connection, to the top surface of a stopper portion 11g, and this stopper portion 11g is formed as the fixing end formed in the front edge of the second side wall portion 11d of the housing 11. By allowing the pin member 17 and the cam member 18 to cooperate with one another, the slide member 14 which moves together with the card 31 can perform push-push actions. Therefore, after the card 31 moves in the insertion direction by a pushing action for pushing the card 31 into the card connector 10 and reaches an end point, the card guide mechanism can permit the card 31 to move in the opposite direction of the insertion direction from the end point by using urging force given by the urging member 15 so that the card 31 can be ejected. Note that, in FIG. 1, depiction of the pin member 17 is partially omitted.

The pin member 17 is held by downward urging force exhibited by a plate spring 12a of the shell 12, as shown in FIG. 2. The plate spring 12a is formed by bending a part of the shell 12 toward the bottom wall portion 11a of the housing 11 so that it can press the pin member 17. The pin member 17 is placed between the plate spring 12a and the slide member 14 or the housing 11, and is held so that such pin member 17 is prevented from being separated from the slide member 14 or the housing 11.

Further, a first contact member 21 and a shared contact member 22 are attached to the back portion of the housing 11, more particularly the innermost wall portion 11b of the housing 11. The first contact member 21 and the shared contact member 22 form a delay switch, which functions as a card ejecting action detecting switch for detecting ejection of the card 31 from the housing 11. This delay switch is operated according to a movement of the card 31, and is brought into conduction, namely, turned on, or brought out of conduction, namely, turned off as the first contact member 21 and the shared contact member 22 come into contact with each other or separated from each other. It should now be appreciated that the delay switch functions as a switch for detecting a pushing action by which the card guide mechanism is urged to push and outwardly eject the card 31 having inserted into the card connector 10.

In this embodiment, the card 31 is ejected when a plurality of times of pushing action are performed in order to push and eject the card 31. The number of pushing action performed may be any plural numbers, for example, three times or more. However, in this description of the embodiment, the pushing actions are carried out twice, namely, a first pushing action and a second pushing action are performed to achieve one for pushing out the card 31 and the other for ejecting same.

During the first pushing action, the slide member 14 of the card guide mechanism receives a force applied to the card 31 by a finger or the like of a user, and is then moved with the card 31 toward the innermost wall portion 11b from a first locking position where the card 31 is held in a locked fashion within the card connector 10. Thereafter, the slide member 14 is further moved to reach a first end point, i.e., the most advanced position where it takes a full stroke state. Subsequently, as soon as the force applied to the card 31 by the user is released, the slide member 14 and the card 31 receive a repulsive force from the urging member 15, and are moved in the direction apart from the innermost wall portion 11b, and then stop at a second locking position: That is to say, a forward stroke from the first locking position to the first end point is followed by a backward stroke returning from the first end point to the second locking position.

Next, during the second pushing action, the slide member 14 of the card guide mechanism again receives a force applied to the card 31 by a finger or the like of the user, and then is moved with the card 31 toward the innermost wall portion 11b from the second locking position. Thereafter, the slide member 14 reaches a second end point, taking a full stroke state. Subsequently, when the force applied to the card 31 by the user is released, the slide member 14 and the card 31 receive a repulsive force from the urging member 15, and are moved in the direction apart from the innermost wall portion 11b while passing through the second locking position. Then, both are further moved in the direction opposite to the insertion direction of the card 31. Namely, a forward stroke from the second locking position to the second end point is followed by a backward stroke from the second end point in the ejection direction of the card 31.

In this case, the afore-mentioned delay switch is switched from a non-conductive state to a conductive state during the forward stroke of the slide member 14 and the card 31 from the first locking position to the first end point by the first pushing action, and this allows the delay switch to detect that the pushing actions for pushing out and ejecting the card 31 have started. On the other hand, the contact pads 34 of the card 31 come out of actual contact with the tip portions of the terminals 13 after the slide member 14 passes through the second locking position during the backward stroke thereof from the second end point. Therefore, the delay time can include a duration of time starting from a point where the slide member 14 and the card 31 change the delay switch to a conduction state during the forward stroke by the first pushing action, and ending at the time when the slide member 14 and the card 31 reach the second locking position from the second end point during the backward stroke by the second pushing action. Therefore, a sufficient length of delay time can be secured. It should be noted that the delay time is defined as a period which starts when the delay switch detects a pushing action for pushing out and ejecting the card 31, and ends at the time when the contact pads 34 of the card 31 come out of contact with the tip portions of the terminals 13.

The first contact member 21 includes an attaching portion 21a that is attached to the innermost wall portion 11b, and a long and thin plate-like body portion 21b having a shape like a cantilever and extending from the attaching portion 21a in a lateral direction (rightward in FIG. 1). It should be understood that the first contact member 21 is made by applying a processing such as punching, bending and the like to a plate member made of a conductive material such as metal and having spring properties. The attaching portion 21a is bent to produce a predetermined angle relative to the body portion 21b. In this embodiment, the attaching portion 21a makes an acute angle with the body portion 21b, and the first contact member 21 has an approximately V-shape. The attaching portion 21a of the first contact member 21 is almost parallel with the side surface of the innermost wall portion 11b. When the card 31 is not inserted in the card connector 10, the body portion 21b is at an angle relative to the side surface of the innermost wall portion 11b, and is arranged so that it is projected to the front side relative to the insertion direction of the card 31.

Moreover, the attaching portion 21a includes a solder tail portion 21d at the bottom end thereof. The solder tail portion 21d is soldered and electrically connected to a terminal member on the objective or target side, for example, a signal line, a contact pad, and a terminal formed in a wiring board or the like of the afore-mentioned electronic device. Meanwhile, a first abutting portion 21c is connected to the tip of the body portion 21b. The first abutting portion 21c is bent relative to the body portion 21b, and is provided so as to project frontward from the bottom edge of the tip of the body portion 21b. The bottom surface of the first abutting portion 21c, which is bulging out to the bottom, functions as an abutting surface onto the shared contact member 22. It should be noted that, as shown in FIG. 1, the first abutting portion 21c is positioned lower than the top surface of the bottom wall portion 11a, so that it is prevented from coming into contact with the bottom surface of the card 31.

The shared contact member 22 includes an attaching portion 22a attached to the innermost wall portion 11b, and a body portion 22b which is bent at an approximately right angle relative to the attaching portion 22a. It should here be noted that the shared contact member 22 is formed by applying processing such as punching, bending and the like to a plate member made of a conductive material such as metal and having a spring property. The body portion 22b is almost parallel with the top surface of the bottom wall portion 11a, and includes a long and thin plate-like first branch portion 22c and a second branch portion 22d, both having a shape like a cantilever and extending in the lateral direction, respectively.

Moreover, the attaching member 22a is provided with a solder tail portion 22g at the bottom end thereof. The solder tail portion 22g is soldered and electrically connected to a terminal member on the target or objective side, for example, a signal line, a contact pad, and a terminal formed in a wiring board or the like of the afore-mentioned electronic device. The first branch portion 22c and the second branch portion 22d are positioned lower than the top surface of the bottom wall portion 11a and therefore, they are positioned lower than the body portion 21b of the first contact member 21.

In addition, a first abutting portion 22e of the shared contact is connected to the tip of the first branch portion 22c. The first abutting portion 22e of the shared contact is provided to project frontward from the tip of the first branch portion 22c, and the top surface of the first abutting portion 22e of the shared contact functions as an abutting surface onto the bottom surface of the downwardly-bulging portion of the first abutting portion 21c of the first contact member 21.

Meanwhile, a second abutting portion 22f of the shared contact is connected to the tip of the second branch portion 22d. This second abutting portion 22f of the shared contact is provided to project frontward from the tip of the second branch portion 22d, and the top surface of the second abutting portion 22f of the shared contact functions as an abutting surface onto a second contact member 23.

Here, the shared contact member 22 forms a card detection switch together with the second contact member 23. The card detection switch detects that the contact pads 34 by which the terminal members of the card 31 are configured, and the terminals 13 are kept in contact with each other, and detects that the card 31 is loaded onto the card connector 10. This card detection switch is operated according to the movement of the card 31, and is brought into a conductive state, i.e., turned on, or, is brought into a non-conductive state, i.e., turned off when the second contact member 23 and the shared contact member 22 come in contact with each other or come out of contact from each other. It should be noted that, in this embodiment, the card detection switch is of the "initially off" type where the switch is off when the card 31 is not inserted into the card connector 10, and the switch is turned on when the card 31 is loaded onto the card connector 10.

The afore-mentioned second contact member 23 includes an attaching portion 23a attached to the first side wall portion 11c, and a long and thin plate-like body portion 23b having a shape like a cantilever and extending from the attaching portion 23a toward the innermost side. It should be noted that the second contact member 23 is formed by applying processing such as punching, bending and the like to a plate member made of a conductive material such as metal and having a spring property. The attaching portion 23a is bent to form a predetermined angle relative to the body portion 23b. In this embodiment, the attaching portion 23a and the body portion 23b makes an acute angle therebetween, and the second contact member 23 has an approximately V-shape. The attaching portion 23a of the second contact member 23 is almost parallel with the side surface of the first side wall portion 11c. The body portion 23b is at an angle relative to the side surface of the first side wall portion 11c and arranged so that it inwardly project when the card 31 is not inserted into the card connector 10. In addition, the body portion 23b is located lower than the top surface of the bottom wall portion 11a.

Moreover, the attaching portion 23a is provided with a solder tail portion 23f at the bottom end thereof. The solder tail portion 23f is soldered and electrically connected to a terminal member on the target or objective side, for example, a signal line, a contact pad, and a terminal formed in a wiring board or the like of the afore-mentioned electronic device.

Further, a second abutting portion 23d is connected to the tip of the body portion 23b via an upwardly projecting portion 23e. The second abutting portion 23d is bent at the almost right angle relative to the body portion 23b, and is provided to inwardly project from the bottom edge of the upper projecting portion 23e. The bottom surface of the downwardly-bulging portion of the second abutting portion 23d functions as an abutting surface onto the second abutting portion 22f of the shared contact of the shared contact member 22. It should be noted that the second abutting portion 23d is positioned lower than the top surface of the bottom wall portion 11a so that it is prevented from coming into contact with the bottom surface of the card 31.

Moreover, a card abutting portion 23c is connected to the front side edge of the upper projecting portion 23e, and is provided to project obliquely toward the outside. This card abutting portion 23c is at an angle relative to the insertion direction of the card 31, and is moved outward as it abuts on the side surface of the card 31 in a given range from the front end of the inserted card 31. Therefore, the second abutting portion 23d is also moved outward and abuts on the second abutting portion 22f of the shared contact.

Next, a description of an operation of the card connector 10 having the above-mentioned construction will be provided. First of all, described are operations of the cam mechanism for performing the push-push type action.

Figure 7D:
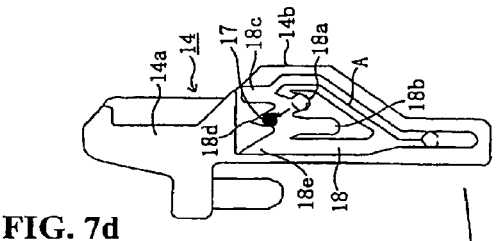
Figure 7C:
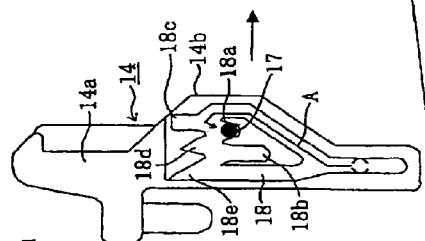
Figure 7B:
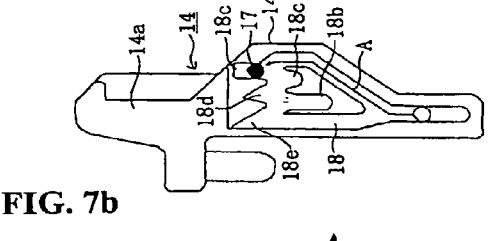
Figure 7A:
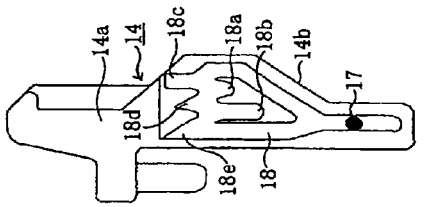
Figure 7G:
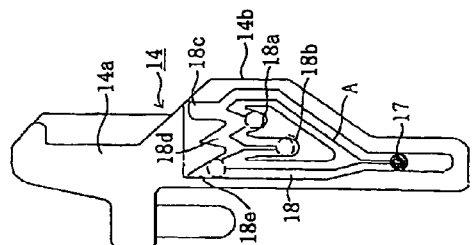
Figure 7F:
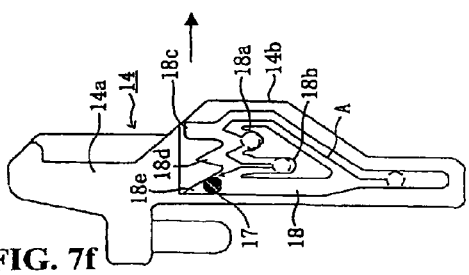
Figure 7E:
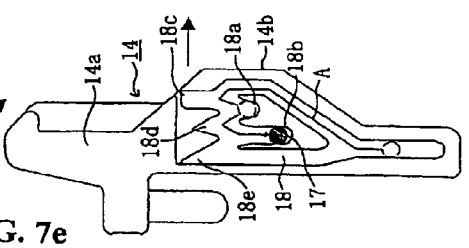

FIGS. 7A to 7G are diagrammatic views showing operations of the cam mechanism according to the embodiment of the present invention. Note that FIG. 7A shows the initial state of card insertion, FIG. 7B shows a state where the free end of the pin member has reached the first end point, FIG. 7C shows a state where the free end of the pin member has reached the first locking position, FIG. 7D shows a state where the free end of the pin member has reached the first end point again, FIG. 7E shows a state where the free end of the pin member has reached the second locking position, FIG. 7F shows a state where the free end of the pin member has reached the second end point, and FIG. 7G shows a state where the free end of the pin member has returned to the initial state of card insertion.

The cam mechanism of this embodiment is configured for performing the push-push type action. However, as described before, this cam mechanism is different from the normal heart-shaped cam mechanism in that this novel cam mechanism requires the first pushing action and the second pushing action to achieve the pushing action for pushing out and ejecting the card 31. Namely, in the normal heart-shaped cam mechanism, the cam groove has a shape as if it extends around the circumference of the heart when viewed from the top, and the area corresponding to the locking position into which the slide member is pushed and locked, and to the periphery of the locking position has an approximately V-shape. On the other hand, as shown in FIGS. 7A to 7G, in the cam mechanism of this embodiment, the cam groove 18 viewed from the top has a shape like two V-letters connected to each other side by side, or equivalently a shape like the W-letter in the area thereof where two regions, one corresponding to end points into which the slide member 14 is inserted, and the other corresponding to locking positions at which the slide member 14 is locked, are connected to each other so that the pushing actions for pushing out and ejecting the card 31 can be performed twice. In the example shown in FIGS. 7A to 7G, it can be seen that the side on which the card holding portion 14a is positioned, namely, the top end side of the cam groove 18 has a shape like the W-letter. Specifically, there are provided a first lock concave portion 18a corresponding to the first locking position, and a second lock concave position 18b corresponding to the second locking position. Further, a first end concave portion 18c and a second end concave portion 18d corresponding to the first end points, and a third end concave portion 18e corresponding to the second end point are further provided.

It will be understood that, to perform three pushing actions for pushing out and ejecting the card 31, another V-shaped groove is additionally provided to the side of the W-shaped groove. This means, when a plurality of pushing actions is required for pushing out and ejecting the card 31, the same number of V-shaped grooves as the pushing actions are to be connected to each other side by side. However, similarly to the normal heart-shaped cam mechanism, the bottom surface of the cam groove 18 has formed therein steps so that the free end of the pin member 17 moves along the cam groove 18 in one direction only.

First of all, a user inserts the card 31 from the front side of the card connector 10 by using his/her finger or the like. At the initial state of the insertion, an engaging convex portion 32 and an engaging concave portion 33 formed on one side of the card 31 are not engaged with the first engaging portion 14*a* and the second engaging portion 14*d* of the slide member 14 of the card guide mechanism. Therefore, the slide member 14 is at the initial state of the insertion of the card 31, and therefore, as shown in FIG. 7A, the free end of the pin member 17 in the cam groove 18 is in the initial state of the insertion of the card 31 as well. It should be noted that, in FIGS. 7A to 7G, the black-colored dot represents the present location of the free end of the pin member 17, the line A indicates the trajectory of the free end of the pin member 17, the arrow given to the end of the line A indicates the moving direction of the pin member 17, and the white-colored dot indicates a key position of the pin member 17 on the trajectory.

Next, when the user pushes the card 31 further into the card connector 10, the engaging convex portion 32 and the engaging concave portion 33 of the card 31 are engaged with the first engaging portion 14*c* and the second engaging portion 14*d* of the slide member 14, and the card 31 moves toward the innermost wall portion 11*b* together with the slide member 14. At this time, the slide member 14 compresses the urging member 15 comprised of a coil spring, so the slide member 14 and the card 31 move against repulsive force of the urging member 15. Thereafter, once the slide member 14 and the card 31 reach the first end point, i.e., the most advanced position where both take a full stroke state thereof, the free end of the pin member 17 reaches the first end concave portion 18*c*, i.e., the innermost portion at the top end of the cam groove 18, as shown in FIG. 7B.

Next, when the user stops pushing the card 31, and releases the pushing force applied to the card 31, the slide member 14 and the card 31 are moved apart from the innermost wall portion 11*b* by repulsive force of the urging member 15. Thereafter, the slide member 14 and the card 31 stop at the first locking position where the card 31 is held in a locked manner within the card connector 10. In this case, as shown in FIG. 7C, the free end of the pin member 17 is latched within the first lock concave portion 18*a* of the cam groove 18. Therefore, a relative movement between the pin member 17 and the slide cam portion 14*b* is restricted, and the slide member 14 and the card 31 are stopped at the first locking position. Further, the card 31 held at the first locking position, can execute data transmissions with operation means or the like of the electronic device on which the card connector 10 is attached.

Next, when ejecting and removing the card 31 from the card connector 10, the user pushes the card 31 into the card connector 10 by using his/her finger or the like, and then the slide member 14 and the card 31 are moved toward the innermost wall portion 11*b* from the first locking position. When the slide member 14 and the card 31 reach the first end point where they take the full stroke state thereof, the free end of the pin member 17 reaches the second end concave portion 18*d* of the cam groove 18 as shown in FIG. 7D.

Next, the user stops pushing the card 31 once, and releases the pushing force applied to the card 31. Then, the slide member 14 and the card 31 are moved apart from the innermost wall portion 11*b* by repulsive force of the urging member 15, and stop at the second locking position. In this case, as shown in FIG. 7E, the free end of the pin member 17 is latched within the second lock concave portion 18*b* of the cam groove 18. It should be noted that, in the example shown in FIGS. 7A to 7G, the second lock concave portion 18*b* is deeper than the first lock concave portion 18*a*. Therefore, when the slide member 14 and the card 31 are stopped at the second locking position, they are far from the innermost wall portion 11*b* and close to the front side of the card connector 10, compared with them being stopped at the first locking position. That is to say, the location of the second locking position is closer to the front side relative to the ejection direction of the card 31 than the first locking position. Hence, when the card 31 is stopped at the second locking position, the amount of projection of the back end of the card 31 from the card connector 10 is larger than the amount of projection of the card 31 which is held at the first locking position. This allows a user to identify whether the card 31 is stopped at the second locking position or the first locking position both visually and through touching with his/her finger or the like.

Next, when the user pushes the card 31 again into the card connector 10, the slide member 14 and the card 31 are again moved toward the innermost wall portion 11*b* from the second locking position. Thereafter, when the slide member 14 and the card 31 reach the second end point, the free end of the pin member 17 reaches the third end concave portion 18*e* of the cam groove 18 as shown in FIG. 7F.

Subsequently, when the user stops pushing the card 31, and releases the pushing force applied to the card 31, the slide member 14 and the card 31 are moved apart from the innermost wall portion 11*b* by repulsive force of the urging member 15, and then further moved in a direction against the insertion direction of the card 31 though the first locking position and the second locking position. Thereafter, the engaging convex portion 32 and the engaging concave position 33 of the card 31 are disengaged from the first engaging portion 14*c* and the second engaging portion 14*d* of the slide member 14, and the slide member 14 and the card 31 are brought back to the initial state of the insertion. In this case, as shown in FIG. 7G, the free end of the pin member 17 returns to the position in the initial state of the insertion of the card 31.

The line A of FIG. 7G clearly indicates that the area in the cam groove 18, which connects the first lock concave portion 18*a* corresponding to the first locking position, the second lock concave portion 18*b* corresponding to the second locking position, the first end concave portion 18*c* and the second end concave portion 18*d* corresponding to the first end points, and the third end concave portion 18*e* corresponding to the second end point, has a shape like the W-letter where two V-letters are connected to each other side by side. Note: the shape of the cam groove 18 shown in FIGS. 7A to 7G is an example only, and may be modified as required. In other words, the cam groove 18 may have any shape as long as the pushing actions for pushing out and ejecting the card 31 can be performed a plurality of times.

Next, a description of operation of the entire card connector 10 will be provided. Described first is an operation of the insertion of the card 31 into the card connector 10 to load the card 31 onto an electronic device to which the card connector 10 is attached.

Figure 8:
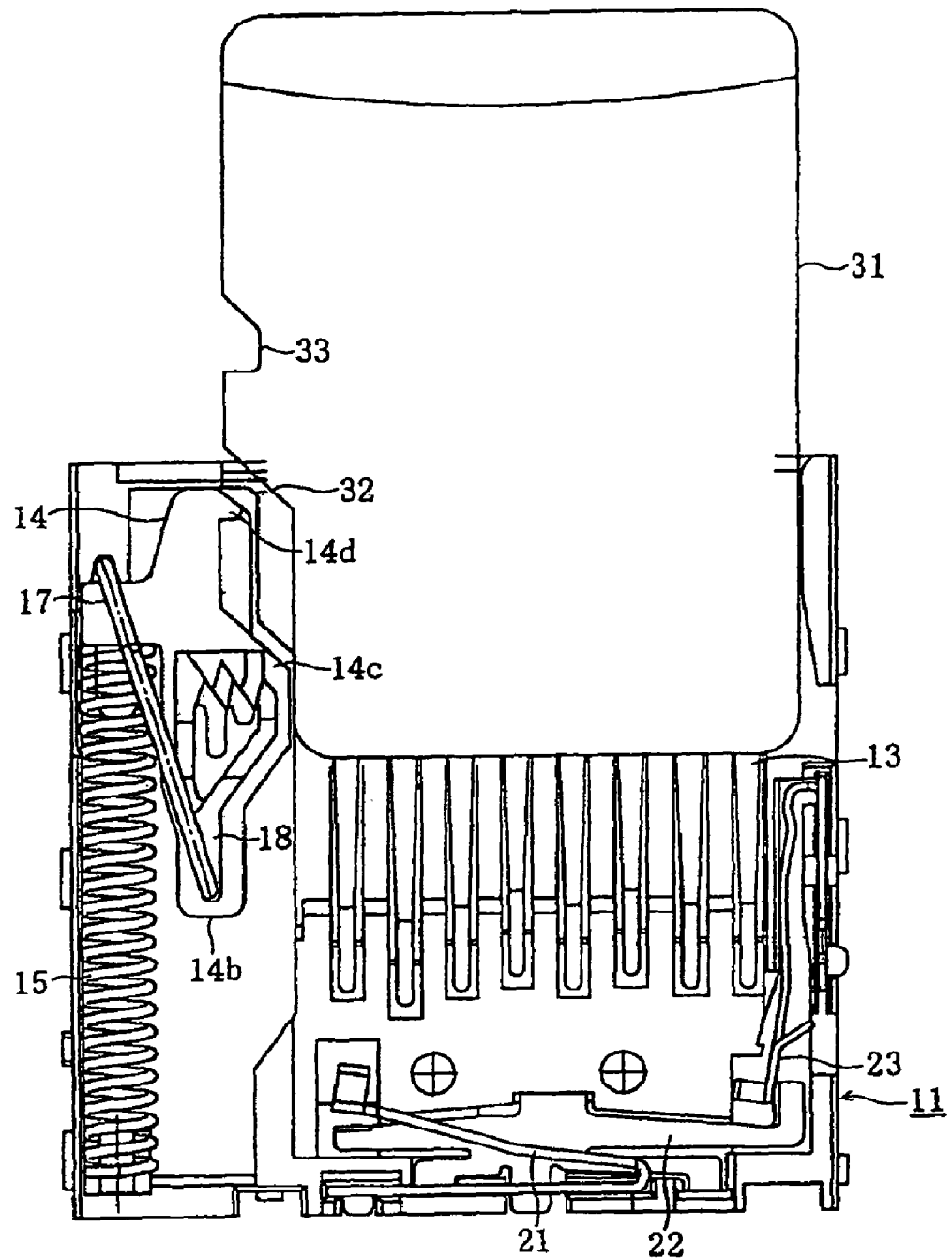
FIG. 8 is a plan view showing the card connector in the initial state of card insertion according to the embodiment of the present invention.
Figure 9:
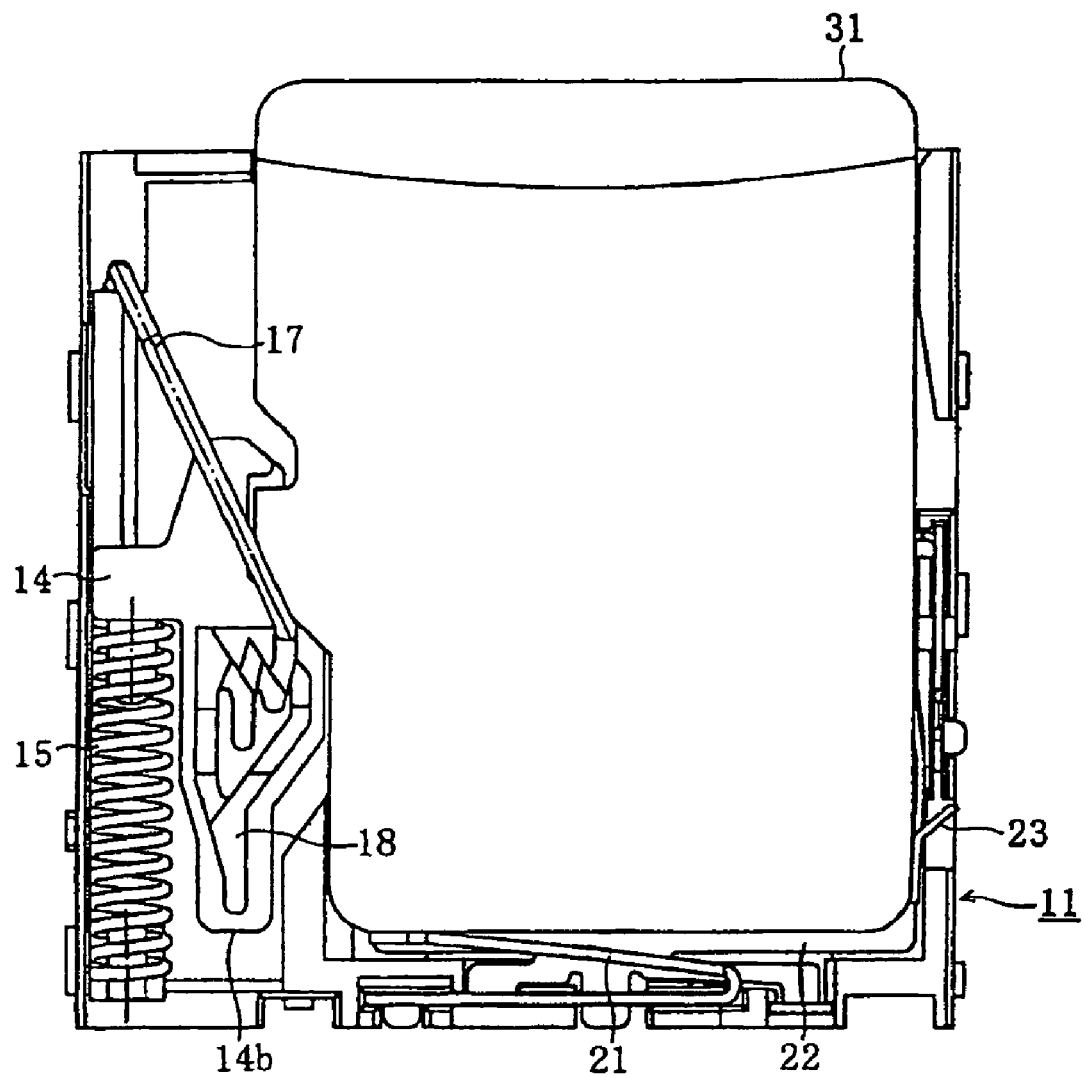
FIG. 9 is a plan view showing the card connector in a first full stroke state of a card according to the embodiment of the present invention.
Figure 10:
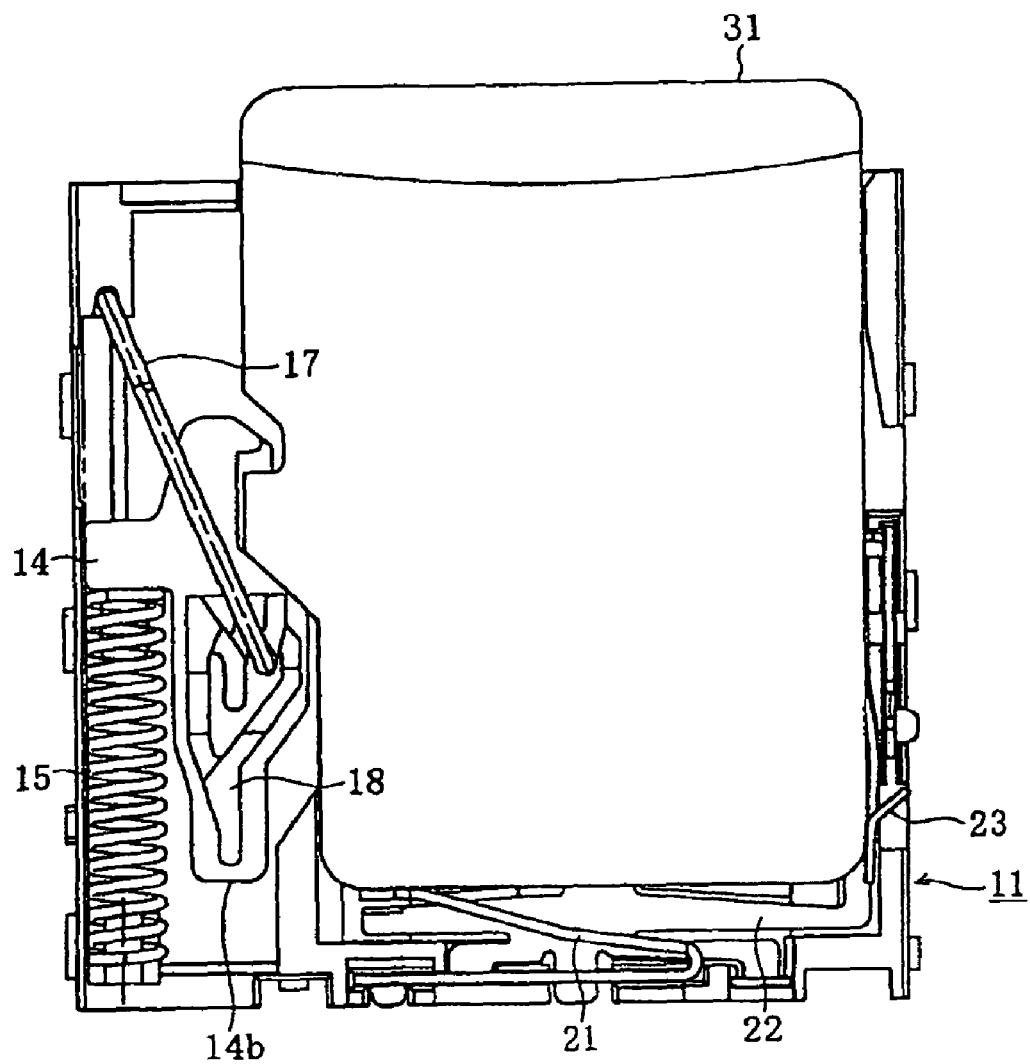
FIG. 10 is a plan view showing the card connector in a first locking state of a card according to the embodiment of the present invention.

FIG. 8 is a plan view illustrating the card connector in the initial state of card insertion according to the embodiment of the present invention, FIG. 9 is a plan view illustrating the card connector in the first card full stroke state according to the embodiment of the present invention, and FIG. 10 is a plan view illustrating the card connector in the first card lock state according to the embodiment of the present invention.

First of all, a user inserts the card 31 from the front side of the card connector 10 by using his/her finger or the like. As shown in FIG. 8, in the initial state of insertion, the contact pads 34 provided to be arranged in the bottom surface of the card 31 have not yet reached the locations of the terminals 13. It should be noted that FIGS. 8 to 10 illustrate the card connector 10 without the shell 12 for the sake of explanation, similarly to FIG. 1. The engaging convex portion 32 and the engaging concave portion 33 formed on one side of the card 31 as engaging portions are not yet engaged with the first engaging portion 14c and the second engaging portion 14d of the slide member 14 of the card guide mechanism. Further, the free end of the pin member 17 in the cam groove 18 is at the position of the initial state of the insertion of the card 31, as shown in FIG. 7A. Furthermore, the first contact member 21 and the shared contact member 22 are not yet in contact with each other and thus, the delay switch is kept in the OFF state thereof. The second contact member 23 and the shared contact member 22 are not yet in contact with each other either and thus, the card detection switch is kept in the OFF state thereof.

Subsequently, when the user pushes the card 31 further into the card connector 10, the engaging convex portion 32 and the engaging concave portion 33 of the card 31 are engaged with the first engaging portion 14c and the second engaging portion 14d of the slide member 14, and the card 31 moves toward the innermost wall portion 11b together with the slide member 14. At this time, the slide member 14 compresses the urging member 15 comprised of a coil spring, so that the slide member 14 and the card 31 receive repulsive force from the urging member 15. However, the repulsive force is less strong compared with the pushing force applied by the finger or the like of the user and thus, the slide member 14 and the card 31 move against the repulsive force.

Next, as shown in FIG. 9, the slide member 14 and the card 31 reach the first end point, i.e., the most advanced position, and take a full stroke state thereof. It should be that, during the stroke to the first end point, one side edge (right side edge in FIG. 9) of the front end of the card 31, and the side surface (right side surface in FIG. 9) in a predetermined area from the side edge of the card 31 come into contact with the card abutting portion 23c and the upper projecting portion 23e of the second contact member 23, displacing the tip of the body portion 23b outward. This allows the second abutting portion 23d of the second contact member 23 to abut on the second abutting portion 22f of the shared contact of the shared contact member 22 and thus, the card detection switch is turned on. Moreover, the front surface of the card 31 in the insertion direction abuts on the body portion 21b of the first contact member 21, displacing the body portion 21b toward the innermost wall portion 11b. Thereafter, the body portion 21b is significantly displaced as the card 31 moves toward the innermost wall portion 11b, and the first abutting portion 21c of the first contact member 21 abuts on the first abutting portion 22e of the shared contact of the shared contact member 22. When the card 31 finally takes the full stroke state, the body portion 21b of the first contact member 21 is pressed against the side surface of the innermost wall portion 11b by the card 31. Further, the free end of the pin member 17 in the cam groove 18 reaches the innermost position at the top end of the cam groove 18 as shown in FIG. 7B.

Subsequently, when the user stops pushing the card 31 and releases the pushing force applied to the card 31, the slide member 14 and the card 31 are moved apart from the innermost wall portion 11b by repulsive force of the urging member 15. Thereafter, as shown in FIG. 10, the slide member 14 and the card 31 stop at the first locking position where the card 31 is held in a locked manner within the card connector 10. This happens because the free end of the pin member 17 is latched in the first lock concave portion 18a of the cam groove 18 as shown in FIG. 7C.

Then, the card 31 held at the first locking position can perform data transmission with operation means or the like of the electronic device to which the card connector 10 is attached. It should be noted that when the card 31 is held at the first locking position, the contact pads 34 on the bottom surface of the card 31 are in contact and have electric conduction with the tip portions of the terminals 13. Then, with the second contact member 23, the tip of the body portion 23b is displaced outward, and the second abutting portion 23d is kept in contact with the second abutting portion 22f of the shared contact of the shared contact member 22. Therefore, the card detection switch is in still ON. Moreover, since the first abutting portion 21c of the first contact member 21 is not brought in contact with the first abutting portion 22e of the shared contact of the shared contact member 22, the delay switch is at its OFF position.

Next, a description of an operation for ejecting and removing the card 31 from the card connector 10 will be provided.

Figure 11:
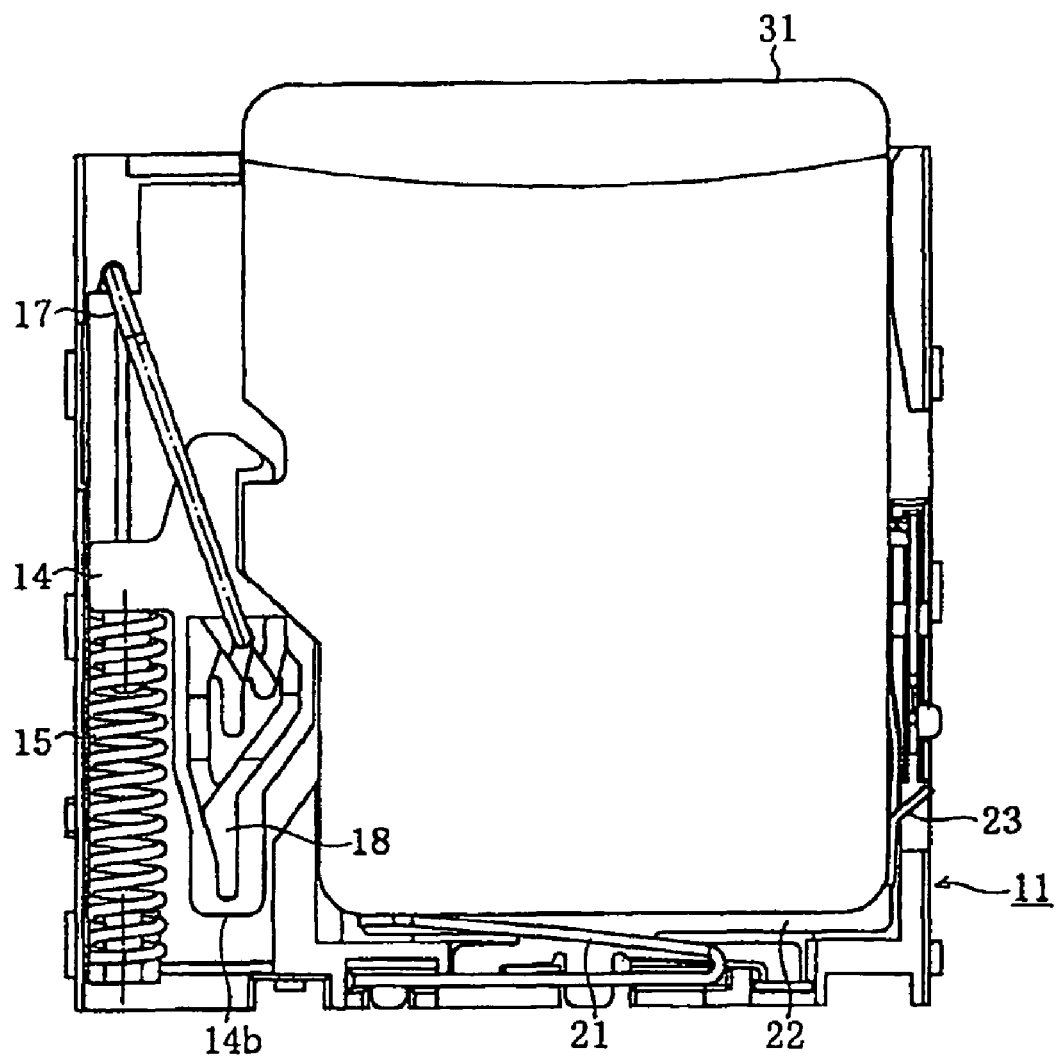
FIG. 11 is a plan view showing the card connector in a second full stroke state of a card according to the embodiment of the present invention.
Figure 12:
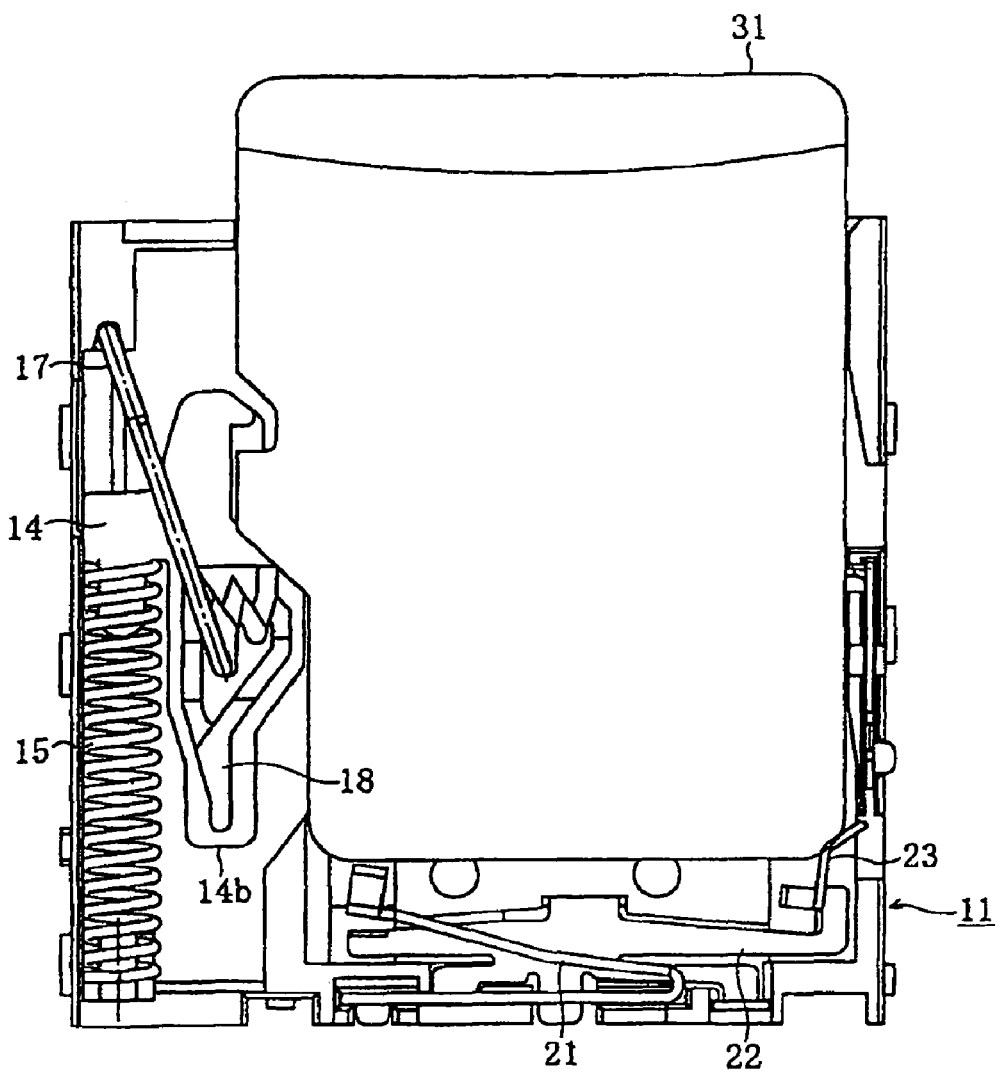
FIG. 12 is a plan view showing the card connector in a second locking state of a card according to the embodiment of the present invention.
Figure 13:
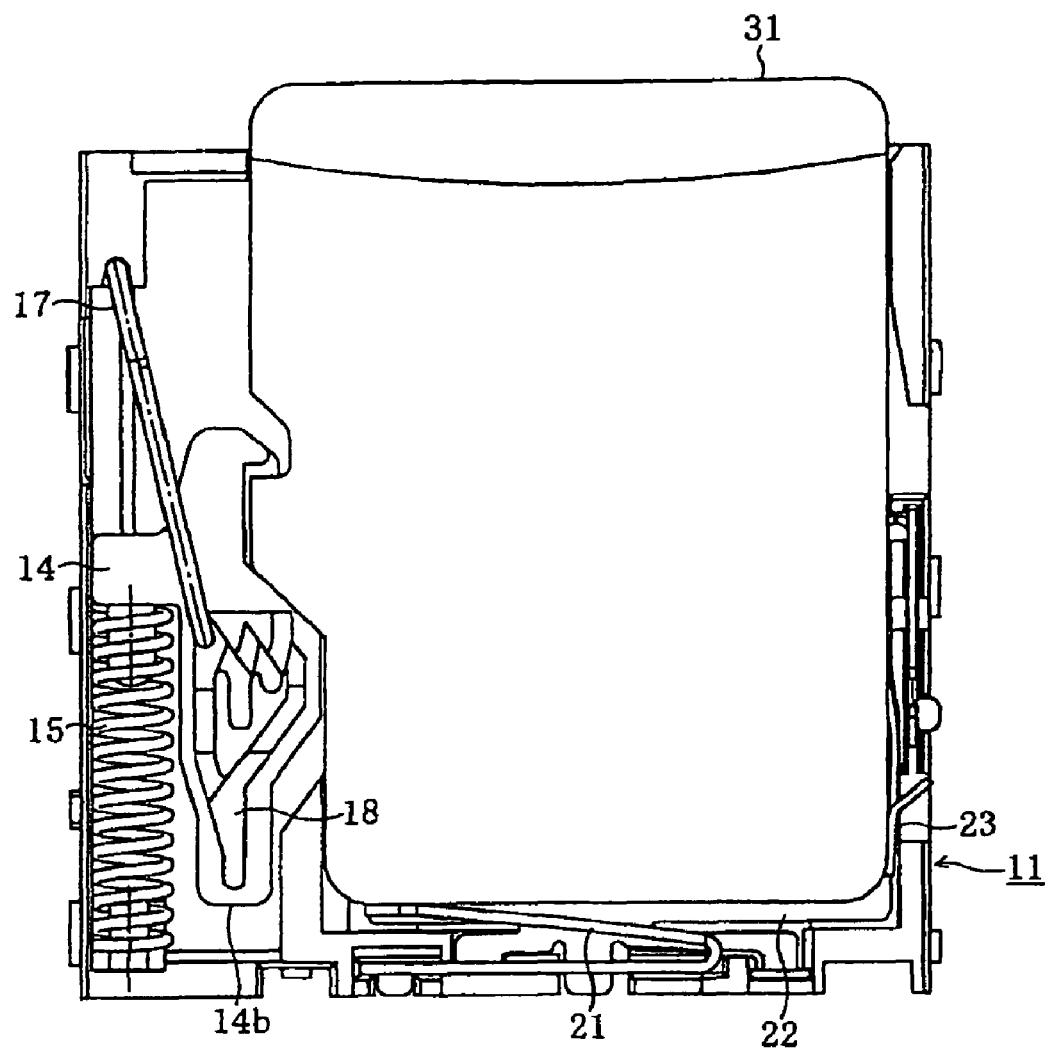
FIG. 13 is a plan view showing the card connector in a third full stroke state of a card according to the embodiment of the present invention.
Figure 14:
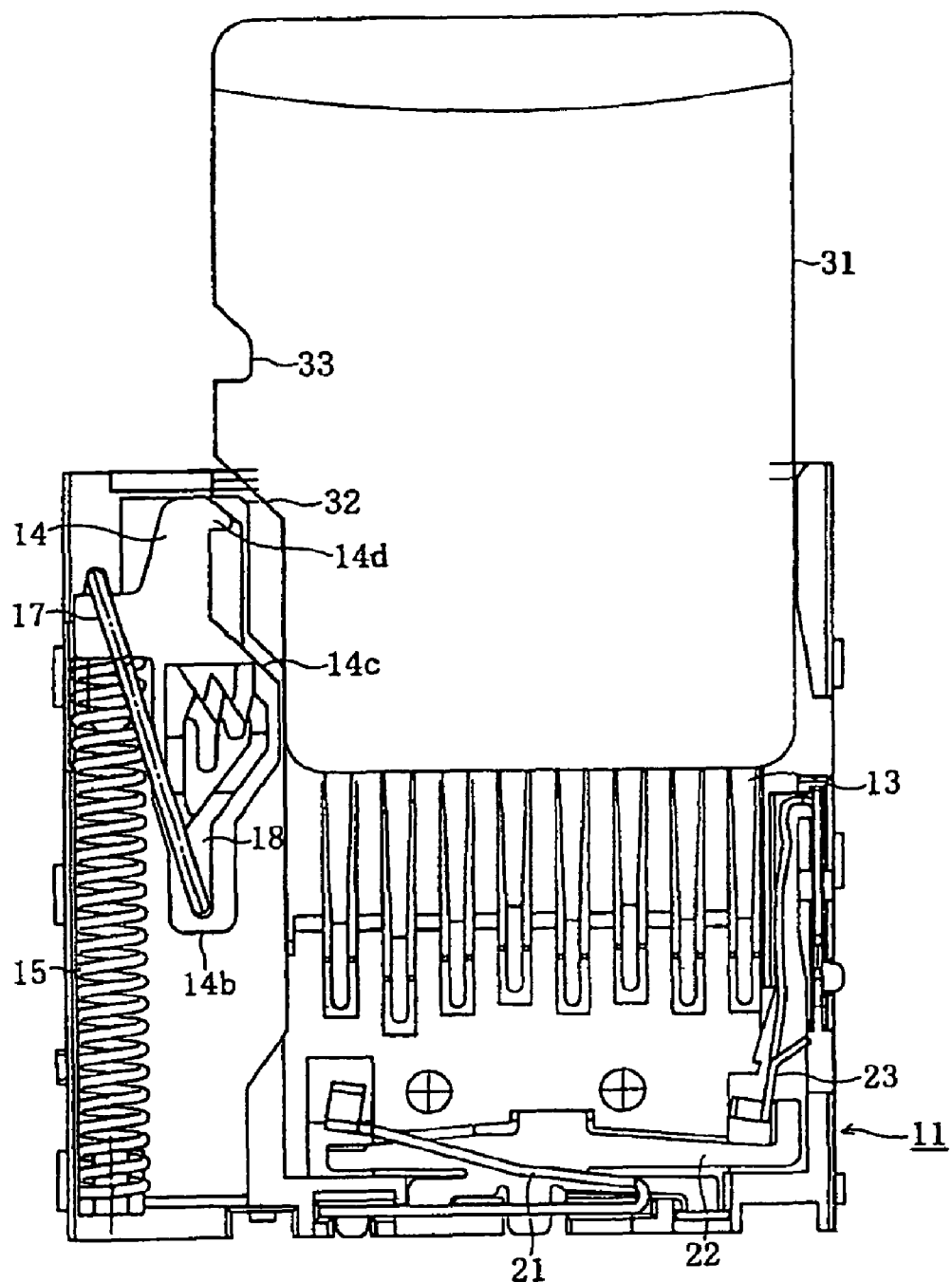
FIG. 14 is a plan view showing the card connector according to the embodiment of the present invention, which has returned to the initial state of card insertion.

FIG. 11 is a plan view illustrating the card connector in the second card full stroke state according to the embodiment of the present invention, FIG. 12 is a plan view illustrating the card connector in the second card lock state according to the embodiment of the present invention, FIG. 13 is a plan view illustrating the card connector in the third card full stroke state according to the embodiment of the present invention, and FIG. 14 is a plan view illustrating the card connector according to the embodiment of the present invention, which has returned to the initial state of the card insertion.

In this case, when a user pushes the card 31 into the card connector 10 by using his/her finger or the like, the slide member 14 and the card 31 are moved toward the innermost wall portion 11b from the first locking position. Then, the front surface of the card 31 in the insertion direction abuts on the body portion 21b of the first contact member 21, so the body portion 21b is displaced toward the innermost wall portion 11b, and the first abutting portion 21c abuts on the first abutting portion 22e of shared contact of the shared contact member 22. Therefore, the delay switch is changed from a non-conductive state to a conductive state, namely, is changed from the OFF state to the ON state, and then detects that pushing actions for ejecting the card 31 have started. During this period, the second contact member 23 and the shared contact member 22 are kept in contact with each other, so the card detection switch remains in the ON state.

Subsequently, when the user pushes the card 31 further into the card connector 10, the slide member 14 and the card 31 reach the first end point, i.e., the most advanced position, and brought into the full stroke state as shown in FIG. 11. Further, the free end of the pin member 17 in the cam groove 18 reaches the innermost position at the top end of the cam groove 18 as shown in FIG. 7D. During this period, the first contact member 21 and the shared contact member 22 are kept in contact with each other, so that the delay switch also remains in the ON state. In addition, the second contact member 23 and the shared contact member 22 are kept in contact with each other, so that the card detection switch remains in the ON state as well.

Next, the user stops pushing the card 31 once, and releases the pushing force applied to the card 31. Then, the slide member 14 and the card 31 are moved apart from the innermost wall portion 11b by repulsive force of the urging member 15, and stop at the second locking position as shown in FIG. 12. Further, the free end of the pin member 17 in the cam groove 18 is latched in the second lock concave portion 18b of the cam groove 18 as shown in FIG. 7E. As stated before, the second lock concave portion 18b is deeper than the first lock concave portion 18a. Therefore, as apparent from comparison between FIGS. 9 and 12, when the slide member 14 and the card 31 are stopped at the second locking position, they are far apart from the innermost wall portion 11b and close to the card 31 ejection side of the card connector 10, compared with them being stopped at the first locking position. Moreover, when the card 31 is stopped at the second locking position, the amount of projection of the back end of the card 31 from the card connector 10 is larger than the amount of projection of the card 31 held at the first locking position. This allows a user to identify whether the card 31 is stopped at the second locking position or the first locking position both visually and through touching with his/her finger or the like.

Then, with the second contact member 23, the tip of the body portion 23b thereof is displaced outward, and the second abutting portion 23d is kept in contact with the second abutting portion 22f of the shared contact of the shared contact member 22. Therefore, the card detection switch is held in the ON state thereof. Further, since the first abutting portion 21c of the first contact member 21 does not come into abutment on the first abutting portion 22e of the shared contact of the shared contact member 22, the delay switch is kept in the OFF state thereof. As described before, when the slide member 14 and the card 31 are moved toward the innermost wall portion 11b from the first locking position, the state of the delay switch is changed from OFF to ON. This means that the start of pushing actions for ejecting the card 31 has already been detected, and therefore, the delay switch may be in the OFF or ON state after the detection.

Subsequently, when the user pushes the card 31 into the card connector 10 again, the slide member 14 and the card 31 are moved toward the innermost wall portion 11b again from the second locking position. Thereafter, the slide member 14 and the card 31 reach the second end point as shown in FIG. 13. Moreover, the free end of the pin member 17 reaches the innermost position at the top end of the cam groove 18 as shown in FIG. 7F. During this period of time, the second contact member 23 and the shared contact member 22 are kept in contact with each other, so that the card detection switch also remains in the ON state. Further, since the first contact member 21 and the shared contact member 22 are in contact with each other, the state of the delay switch is changed from OFF to ON.

Subsequently, the user stops pushing the card 31, and releases the pushing force applied to the card 31. Then, the slide member 14 and the card 31 are moved apart from the innermost wall portion 11b by repulsive force of the urging member 15. In this case, since the free end of the pin member 17 can move within the cam groove 18 without any restriction, the slide member 14 is stopped at neither the first locking position nor the second locking position. Thereafter, the slide member 14 and the card 31 pass through the first locking position and the second locking position, and move further in the direction opposite to the insertion direction of the card 31. The engaging convex portion 32 and the engaging concave portion 33 of the card 31 are disengaged from the first engaging portion 14c and the second engaging portion 14d of the slide member 14, and the slide member 14 and the card 31 are brought back to the initial state of insertion as shown in FIG. 14. In the process of returning to the first locking position from the first end point, the body portion 21b of the first contact member 21 is brought back to the original attitude by its own spring properties, and the first contact member 21 and the shared contact member 22 are separated from each other. Therefore, the state of the delay switch is changed from the ON to the OFF. Moreover, since the body portion 23b of the second contact member 23 is also brought back to the original attitude by its own elastic property, the second contact member 23 and the shared contact member 22 are separated from each other. The state of the card detection switch is thus changed from the ON to the OFF as well.

Next, a description of operation timing of the delay switch in association with the movement of the card 31 will be provided.

Figure 15:
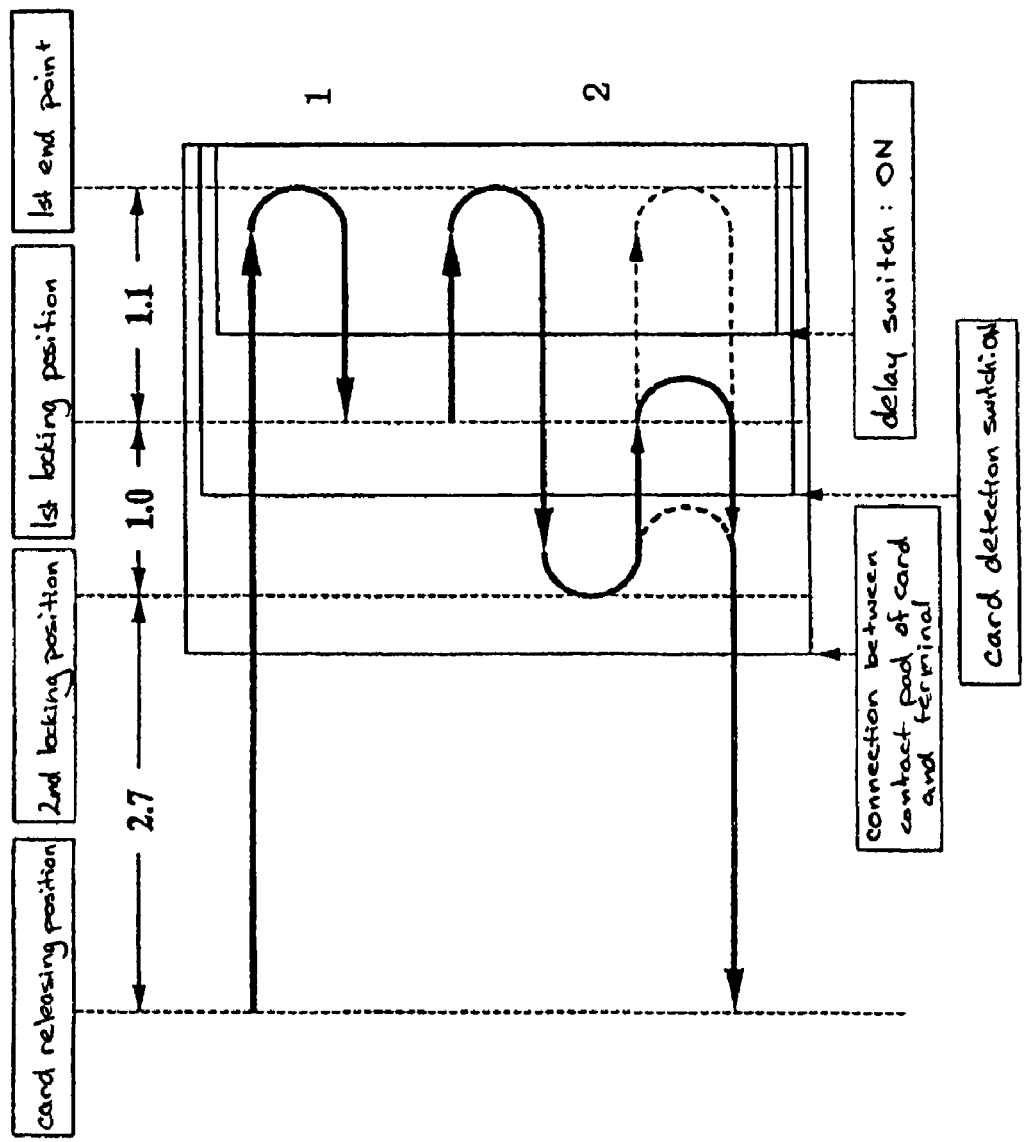
FIG. 15 is a graphical view showing various signal timings in association with movements of the card in the card connector according to the embodiment of the present invention.
Figure 16:
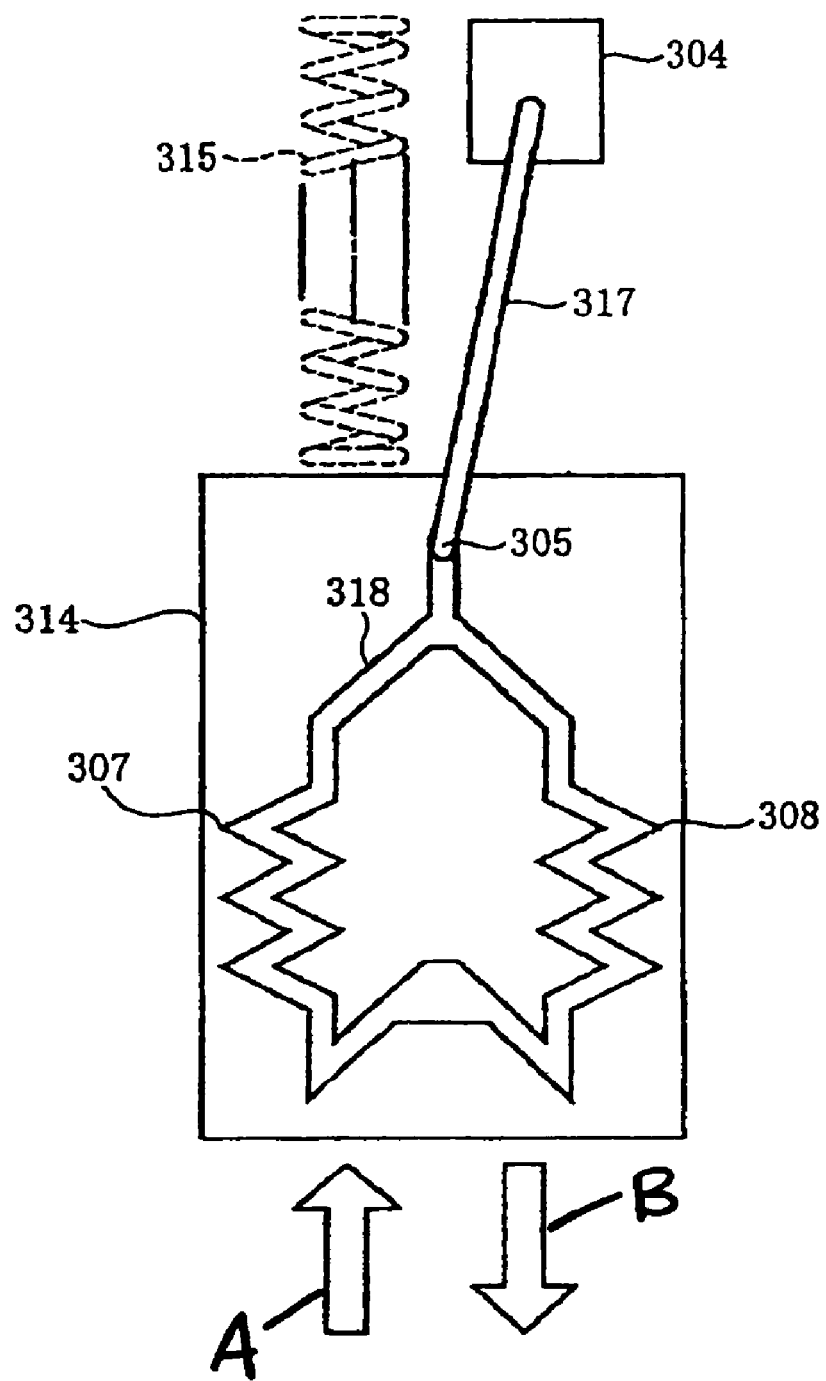
FIG. 16 is a schematic view showing a heart cam mechanism accommodated in a conventional card connector.

FIG. 15 is a diagrammatic view illustrating various signal timings in association with the movement of the card in the card connector according to the embodiment of the present invention.

In FIG. 15, the solid line arrow indicates the movement of the card 31 while the card 31 is pushed and inserted into the card connector 10, namely, during a push-in action, as well as the movement of the card 31 while the card 31 is pushed out and removed from the card connector 10, namely, during the push-out action. Further, the card's moving distance is an actual measured value when a card connector produced by the inventor(s) of the present invention as a prototype was employed, and the unit of measure for the distance is millimeter. It should be noted that when the line of the arrow in the chart of FIG. 15 is on the right side of the respective ON positions, the contact pads 34 of the card 31 and the terminals 13 are connected, and the card detection switch and the delay switch are remained ON.

As is apparent from this drawing figure, when the card 31 is ejected and removed from the card connector 10, the state of the delay switch is changed from the OFF to the ON during the forward stroke of the card 31 form the first locking position to the first end point, and the delay switch detects that the pushing actions have started. Thereafter, the contact pads 34 of the card 31 are actually disconnected from the terminals 13 after the slide member 14 passes through the second locking position during the backward stroke from the second end point after the second pushing action was performed.

Therefore, the delay time may include the time period that the card 31 moves from point where the delay switch is changed into a conductive state to the first end point during the forward stroke from the first locking position by the first pushing action, as well as the time period that the card 31 reaches the second locking position from the first end point during the backward stroke after the first pushing action. In addition to this, the delay time may also include the time period that the card 31 reaches the second end point from the second locking position during the forward stroke by the second pushing action, as well as the time period that the card 31 reaches the second locking position from the second end point during the backward stroke after the second pushing action. Therefore, the delay time which starts from the point when the delay switch detects the start of pushing actions and ends at the time when the contact pads 34 of the card 31 are actually disconnected from the terminal 13, can be sufficiently long.

Moreover, if there is a delay before start of the second pushing action after the card 31 reaches the second locking position following the first pushing action, this delay is also included in the delay time, additionally lengthening the delay time even further.

Generally, in an electronic device like a mobile phone or the like, once a delay switch detects that the pushing action has started, any access to a card is suspended by software. Therefore, it usually takes at least 250 milliseconds until the software operation for suspending an access to the card is completed after the delay switch detects that the pushing action has started. Meanwhile, when a slide member urged by a coil spring ejects the card, its normal moving speed is about 0.1 mm/millisecond. Therefore, in a case of small-sized card connector in which a moving distance of a card from a locking position to an end point is approximately 2 millimeters, it is difficult to secure a delay time of 250 milliseconds or longer.

On the other hand, in this embodiment, the pushing actions for ejecting the card 31 are performed twice, and, the delay time includes the period of time that the card 31 is moved forward and backward twice by the first and second pushing actions. Therefore, an appreciable length of delay time can be secured.

Note that, in this embodiment, the position of the second end point is different from that of the first end point, as shown in FIG. 15. However, the position of the second end point may be changed as necessary by adjusting the shape of the cam groove 18 formed in the top surface of the slide cam portion 14*b*. For example, the second end point can be located at the same position as the first end point, or may be moved even farther from the first end point. In both cases, the movement of the card 31 becomes like those indicated by the broken line arrows in FIG. 15. Similarly, the second locking position can be changed as appropriate by adjusting the shape of the cam groove 18. For example, the location of the second locking position may be the same as that of the first locking position, or separated even farther from the location of the first locking position.

As described above, in the card connector 10 of this embodiment, the card 31 is ejected by performing a plurality of times of pushing action, and a card ejecting action detecting switch is provided for detecting that ejection of the card 31 has started during the forward stroke of the card 31 by the first pushing action. Therefore, the forward and backward strokes by the plurality of pushing actions in ejecting the card 31 are included in the delay time, and a sufficient length of delay time can be secured accordingly. Hence, when ejecting and removing the card 31 from the card connector 10, an electronic device to which the card connector 10 is attached can block the circuit which connects the operation means thereof and the card 31 during this sufficient length of delay time.

Moreover, the forward stroke of the card 31 by each pushing action performed to eject the card 31 is done as a user pushes the card 31 in by using his/her finger or the like against repulsive force of the urging member 15, and that is why the moving speed of the card 31 is slow. Therefore, the delay time including the plurality of forward strokes can be sufficiently long. Furthermore, the construction of the card connector 10 can be simplified and thus reduces the cost for manufacturing the card connector 10, and, the card connector 10 can be of small size.

Further, the card 31 is not ejected unless the pushing actions are performed plural times. Accordingly, even if a user pushes the card 31 with his/her finger or the like by mistake, the card 31 does not pop out from the card connector 10, preventing the card 31 from being lost due to the erroneous operation that makes the card 31 pop out.

Furthermore, the card guide mechanism includes the slide cam portion 14*b* having the surface in which the cam groove 18 is formed, and the pin member 17 one end of which is engaged with the cam groove 18. The cam groove 18 has a shape like two V-shaped grooves being connected to each other side by side in an area where a region corresponding to the locking positions and a region corresponding to the end points are connected to each other. In this case, the card guide mechanism can be acquired by modifying the shape of the cam groove of the normal heart-shaped cam mechanism, so that the card guide mechanism may be produced at a low cost, and its construction can be simple.

Moreover, when the pushing actions for ejecting the card 31 are performed twice, the card guide mechanism works as follows. The card guide mechanism holds the card 31 at the first locking position to ensure the contact pads 34 of the card 31 be kept in contact with the terminals 13. Then, after the card 31 held at the first locking position is pushed by the pushing action in the insertion direction, and the card 31 moves in the insertion direction until it reaches the first end point, the card guide mechanism moves the card 31 in the opposite direction of the insertion direction from the first end point by using urging force of the urging member 15, and then holds the card 31 at the second locking position. Then, after the card 31 held at the second locking position is pushed by the pushing action in the insertion direction and moves in the insertion direction until it reaches the second end point, the card guide mechanism moves the card 31 in the opposite direction of the insertion direction from the second end point by using urging force of the urging member 15 so that the card 31 is ejected from the card connector 10.

Therefore, the delay time may include the time period that the card 31 moves from point where the delay switch is changed into a conductive state to the first end point during the forward stroke from the first locking position by the first pushing action, as well as the time period that the card 31 reaches the second locking position from the first end point during the backward stroke after the first pushing action. In addition to this, the delay time can also include the time period that the card 31 reaches the second end point from the second locking position during the forward stroke by the second pushing action, as well as the time period that the card 31 reaches the second locking position from the second end point during the backward stroke after the second pushing action. Therefore, the delay time which starts from the point when the delay switch detects the start of pushing actions and ends at the time when the contact pads 34 of the card 31 are actually disconnected from the terminal 13, can be sufficiently long. Moreover, if there is a delay before the start of the second pushing action after the card 31 reaches the second locking position following the first pushing action, this delay is also included in the delay time, extending the delay time even further.

Moreover, the second locking position is closer to the front side relative to the ejection direction of the card 31 than the first locking position.

When the card 31 is stopped at the second locking position, the amount of projection of the back end of the card 31 from the card connector 10 is larger than the amount of projection of the card 31 which is held at the first locking position. This allows a user to surely identify whether the card 31 is stopped at the second locking position or the first locking position both visually and through touching with his/her finger or the like. Hence, the user can know the ejection timing of the card 31 accurately, preventing the card 31 from being lost.

Furthermore, the card connector 10 further includes the card detection switch for detecting whether the contact pads 34 of the card 31 are in contact with the terminals 13. This ensures detection of contact between the contact pads 34 of the card 31 and the terminals 13, and the electronic device on which the card connector 10 is attached can ensure that a circuit that connects the operation means thereof and the card 31 is brought into a conductive state safely during the delay time.

The present invention is not limited to the above-described embodiments, and may be changed in various ways based on the gist of the present invention, and these changes are not eliminated from the scope of the present invention.

What is claimed is:

1. A card connector, comprising:
   a housing, the housing including a receptacle to receive therein a card in an insertion direction, the card having a terminal member;
   a connection terminal, the connection terminal being secured to the housing and configured to contact the terminal member of the card upon insertion of the card into the receptacle;
   a card ejecting action detecting switch, the card ejecting action detecting switch being configured to detect that the card is ejected from the housing; and
   a card guide mechanism, the card guide mechanism including an urging member for urging the card in a direction opposite the insertion direction, the card guide mechanism being configured to hold the card at a locked position to ensure contact between the terminal member of the card with the connection terminal and, to permit movement of the card in said opposite direction to thereby eject the card, by a pushing force exerted on the card in the insertion direction;
   wherein the card guide mechanism:
      ejects the card after performing a pushing action twice,
      holds the card at a first locking position to ensure that the terminal member of the card and the connection terminal are kept in contact with each other,
      allows the card to move in the opposite direction of the insertion direction from the first end point by using urging force of the urging member after the card held at the first locking position is moved in the insertion direction by a pushing action for pushing the card in the insertion direction and reaches a first end point, and
      allows the card to move in the opposite direction of the insertion direction from the second end point by using the urging force of the urging member to thereby eject the card after the card held at the second locking position is moved in the insertion direction by the pushing action for pushing the card in the insertion direction and reaches a second end point.

2. The card connector according to claim 1, wherein the card guide mechanism further includes a movable cam member formed with a cam groove in a surface thereof and a fixed cam member having one end thereof engaged into the cam groove, the cam groove having a shape where a region corresponding to the locking position and a region corresponding to the end point are arranged alternately.

3. The card connector according to claim 1, wherein the second locking position is closer to a front side of the card connector relative to an ejection direction of the card than the first locking position.

4. The card connector according to claim 1, further comprising a card detection switch the card detection switch being configured to detect that the terminal member of the card and the connection terminal are in contact with each other.

5. A card connector for receiving a card therein, the card having a plurality of contact members, the card connector comprising:
   a housing, the housing having a receptacle to receive the card in an insertion direction;
   a plurality of conductive terminals, each conductive terminal being configured to contact a respective contact member of the card upon insertion of the card into the receptacle;
   a card guide mechanism, the card guide mechanism being movable between an insertion position at which the card may be inserted into the receptacle and a first locked position at which each contact member of the card engages a respective conductive terminal of said connector;
   an urging member, the urging member being adapted to urge the card guide mechanism in a direction opposite the insertion direction; and
   a cam groove, the cam groove being disposed on the card guide mechanism and configured to direct movement of the card guide mechanism between the insertion position and the first locked position upon the application of a pushing force on an inserted card in the insertion direction, the cam groove including:
      an extension section at which a cam pin of the card connector is positioned when the card guide mechanism is at the insertion position,
      a first locking recess at which the cam pin is retained when the card guide mechanism is at the first locked position, and
      a second locking recess spaced laterally from the first locking recess at which the cam pin is retained when the card guide mechanism is positioned at a second locked position and at which the contact members of the card continue to engage their respective conductive terminals of the connector.

6. The card connector according to claim 5, wherein the card guide mechanism ejects the card after performing two pushing actions on an inserted card.

7. The card connector according to claim 6, wherein the card guide mechanism is movably mounted on the housing.

8. The card connector according to claim 6, wherein the cam groove is elongated and the first locking recess is spaced longitudinally relative to the extension section.

9. The card connector according to claim 8, wherein the second locking recess is closer to the extension section than the first locking recess in the insertion direction.

10. The card connector according to claim 6, wherein the cam groove has a pair of elongated paths extending generally in the insertion direction from the extension section and a W-shaped section between ends of the elongated paths opposite the extension section.

11. The card connector according to claim 10, wherein the W-shaped section interconnects the ends of the elongated paths.

12. The card connector according to claim 6, wherein the cam pin is biased into the first locking recess by the urging member when the card guide mechanism is at the first locked position and the cam pin is biased into the second locking recess by the urging member when the card guide mechanism is at the second locked position.

13. The card connector according to claim 6, further including a card ejecting action detecting switch configured to detect that the card is ejected from the housing.

14. A card connector for receiving a card therein, the card having a plurality of contact members along a surface thereof, the card connector comprising:
   a housing, the housing having a receptacle to receive the card in an insertion direction;

a plurality of conductive terminals, each conductive terminal being configured to contact a respective contact member upon insertion of the card into the receptacle;

a card guide mechanism, the card guide mechanism being mounted on the housing and movable between an insertion position at which the card may be inserted into the receptacle, a first locked position at which each contact member of the card engages a respective conductive terminal of the card connector and a second locked position at which the contact members of the card engage their respective conductive terminals of the card connector;

an urging member, the urging member being configured to urge the card guide mechanism in a direction opposite the insertion direction; and an elongated cam groove, the elongated cam groove being disposed on the card guide mechanism and configured to direct movement of the card guide mechanism between the insertion position and the first locked position upon the application of a pushing force on an inserted card in the insertion direction, the cam groove including:

an extension section at which a cam pin of the card connector is positioned when the card guide mechanism is at the insertion position, a first locking recess spaced from the extension section along the insertion direction and into which the cam pin is biased by the urging member upon removal of a pushing force on the inserted card so as to retain the card guide mechanism at the first locked position, and a second locking recess spaced from the first locking recess laterally to the insertion direction and into which the cam pin is biased by the urging member upon removal of a pushing force on the inserted card so as to retain the card guide mechanism at the second locked position and at which the contact members of the card continue to engage their respective conductive terminals of the card connector.

15. The card connector according to claim 14, wherein upon pushing an inserted card a first time, the card guide mechanism moves from the first locked position to the second locked position and upon pushing the inserted card a second time, the card guide mechanism moves from the second locked position to the insertion position to eject the card from the receptacle.

16. The card connector according to claim 15, wherein the second locking recess is closer to the extension section than the first locking recess along the insertion direction.

17. The card connector according to claim 15, wherein the cam groove has a pair of elongated paths extending generally along the insertion direction from the extension section and a W-shaped section between ends of the elongated paths opposite the extension section.

18. The card connector according to claim 17, wherein the W-shaped section interconnects the ends of the elongated paths.

19. The card connector according to claim 15, further including a card ejecting action detecting switch configured to detect that the card is ejected from the housing.

* * * * *